United States Patent
Jeon

(10) Patent No.: US 9,928,354 B2
(45) Date of Patent: Mar. 27, 2018

(54) MOBILE TERMINAL AND METHOD OF CONTROLLING THEREFOR

(71) Applicant: LG ELECTRONICS INC., Seoul (KR)

(72) Inventor: Hyunjoo Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 14/980,349

(22) Filed: Dec. 28, 2015

(65) Prior Publication Data

US 2016/0342781 A1    Nov. 24, 2016

(30) Foreign Application Priority Data

May 19, 2015   (KR) .................... 10-2015-0069639

(51) Int. Cl.
| | | |
|---|---|---|
| *G06F 21/00* | (2013.01) | |
| *G06F 21/32* | (2013.01) | |
| *G06K 9/00* | (2006.01) | |

(52) U.S. Cl.
CPC ......... *G06F 21/32* (2013.01); *G06K 9/00087* (2013.01); *G06K 9/00926* (2013.01); *G09G 2358/00* (2013.01)

(58) Field of Classification Search
CPC ................ G06F 21/32; G06K 9/00926; G06K 9/00087; G09G 2358/00
See application file for complete search history.

(56) References Cited

U.S. PATENT DOCUMENTS

| | | | | |
|---|---|---|---|---|
| 6,198,996 B1 * | 3/2001 | Berstis | ................ | B60R 25/2018 701/36 |
| 6,259,805 B1 * | 7/2001 | Freedman | .......... | G06K 9/00087 382/115 |
| 6,341,171 B1 * | 1/2002 | de Lanauze | ....... | G06K 9/00067 382/124 |

(Continued)

FOREIGN PATENT DOCUMENTS

| | | |
|---|---|---|
| KR | 10-2009-0054565 A | 6/2009 |
| WO | WO 2015/009111 A1 | 1/2015 |
| WO | WO 2015/056844 A1 | 4/2015 |

*Primary Examiner* — David Garcia Cervetti
(74) *Attorney, Agent, or Firm* — Birch, Stewart, Kolasch & Birch, LLP

(57) ABSTRACT

A mobile terminal including a display unit; a fingerprint sensing unit; a memory configured to store fingerprint information; and a controller configured to receive a first fingerprint input via the fingerprint sensing unit for displaying content requiring user authentication, compare the first fingerprint input with the stored fingerprint information, output fingerprint authentication feedback indicating the first fingerprint input is insufficient for displaying the content requiring user authentication, in response to the first fingerprint input matching with the stored fingerprint information within a first predetermined range but less than a second predetermined range greater than the first predetermined range, receive a second fingerprint input via the fingerprint sensing unit, compare the second fingerprint input with the stored fingerprint information, and display the content requiring the user authentication in response to the second fingerprint input matching with the stored fingerprint information within the second predetermined range.

18 Claims, 21 Drawing Sheets

(56) References Cited

U.S. PATENT DOCUMENTS

| | | | | |
|---|---|---|---|---|
| 6,498,861 B1* | 12/2002 | Hamid | G06K 9/00087 | 340/5.52 |
| 7,336,174 B1* | 2/2008 | Maloney | G08B 13/1427 | 340/568.1 |
| 7,359,534 B2* | 4/2008 | Semba | G06K 9/00006 | 382/124 |
| 9,542,783 B2* | 1/2017 | Slaby | G07C 9/00079 | |
| 9,613,252 B1* | 4/2017 | Chiang | G06K 9/00087 | |
| 9,672,408 B2* | 6/2017 | Johansson | G06K 9/00087 | |
| 9,733,740 B2* | 8/2017 | Cho | G06F 3/0412 | |
| 2001/0034220 A1* | 10/2001 | Berstis | G11B 27/002 | 455/186.1 |
| 2010/0162386 A1* | 6/2010 | Li | G06F 21/32 | 726/19 |
| 2010/0315356 A1* | 12/2010 | Ferren | G06F 1/169 | 345/173 |
| 2012/0044156 A1* | 2/2012 | Michaelis | G06F 3/03547 | 345/173 |
| 2012/0163663 A1* | 6/2012 | Masoud | A61N 1/37229 | 382/103 |
| 2012/0256280 A1* | 10/2012 | Erhart | H01L 21/561 | 257/414 |
| 2013/0031623 A1* | 1/2013 | Sanders | G06F 21/34 | 726/19 |
| 2013/0076482 A1* | 3/2013 | Wan | G07C 9/00087 | 340/5.3 |
| 2013/0133049 A1* | 5/2013 | Peirce | G06F 21/32 | 726/6 |
| 2013/0208103 A1* | 8/2013 | Sands | G06F 21/31 | 348/78 |
| 2013/0227651 A1* | 8/2013 | Schultz | G06F 21/32 | 726/4 |
| 2013/0267204 A1* | 10/2013 | Schultz | H04W 12/06 | 455/411 |
| 2013/0307670 A1* | 11/2013 | Ramaci | G06F 21/6245 | 340/5.82 |
| 2013/0339242 A1* | 12/2013 | McHugh | G06Q 20/40 | 705/44 |
| 2014/0003677 A1* | 1/2014 | Han | G06K 9/00006 | 382/124 |
| 2014/0354402 A1* | 12/2014 | Joao | G07C 9/00571 | 340/5.52 |
| 2015/0074615 A1* | 3/2015 | Han | G06K 9/00033 | 715/863 |
| 2015/0086090 A1* | 3/2015 | Jung | G06K 9/00013 | 382/124 |
| 2015/0098631 A1* | 4/2015 | Palmer | G06K 9/00288 | 382/118 |
| 2015/0116086 A1* | 4/2015 | Kim | G06F 21/32 | 340/5.83 |
| 2015/0137938 A1* | 5/2015 | Slaby | G06F 21/32 | 340/5.53 |
| 2015/0254446 A1* | 9/2015 | LaCous | G06F 21/32 | 726/19 |
| 2015/0371073 A1* | 12/2015 | Cho | G06F 3/0488 | 382/124 |
| 2016/0042219 A1* | 2/2016 | Bae | G06K 9/00013 | 382/124 |
| 2016/0147825 A1* | 5/2016 | Chiang | G06F 17/30377 | 707/728 |
| 2016/0147987 A1* | 5/2016 | Jang | G06F 21/32 | 726/19 |
| 2016/0180145 A1* | 6/2016 | Setterberg | G06K 9/00026 | 382/124 |
| 2016/0180146 A1* | 6/2016 | Setterberg | G06F 3/044 | 382/124 |
| 2016/0246396 A1* | 8/2016 | Dickinson | G06F 3/03545 | |
| 2016/0275281 A1* | 9/2016 | Ranjit | G06F 21/32 | |
| 2017/0039409 A1* | 2/2017 | Han | G06K 9/00926 | |
| 2017/0124316 A1* | 5/2017 | Slaby | G06F 21/32 | |
| 2017/0308215 A1* | 10/2017 | Cho | G06F 3/0488 | |

* cited by examiner

FIG. 6
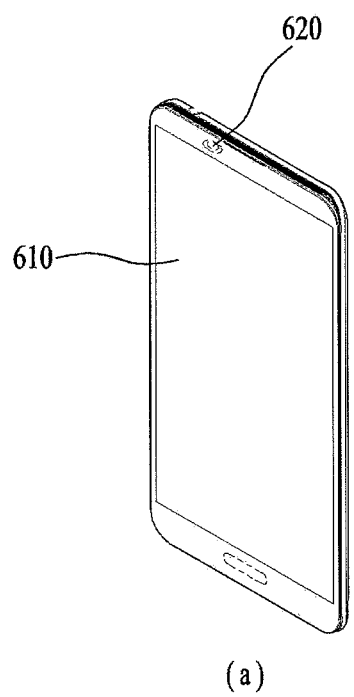
(a)
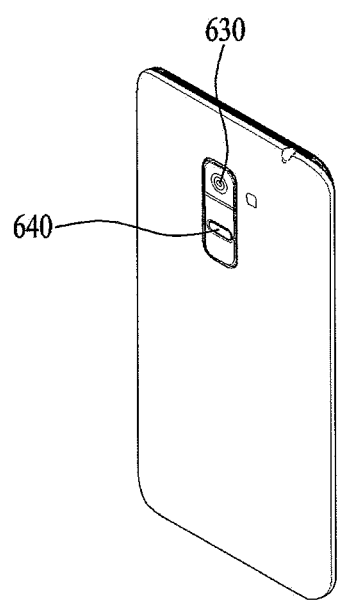
(b)

FIG. 13
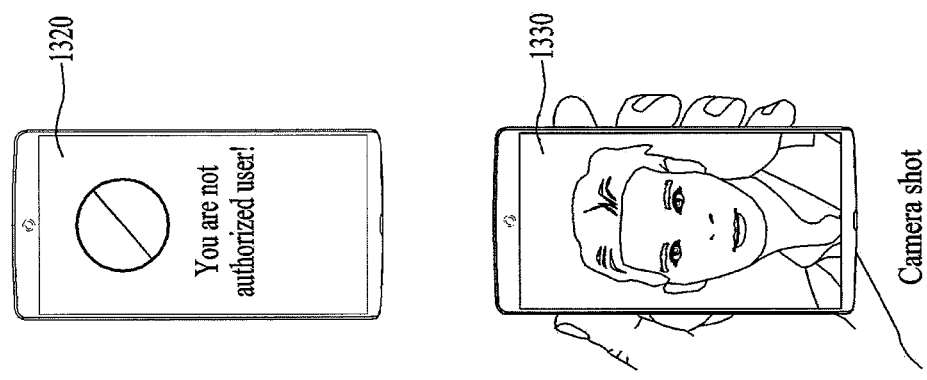
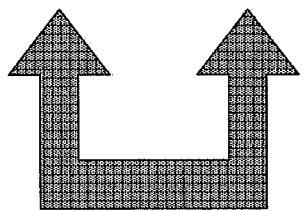
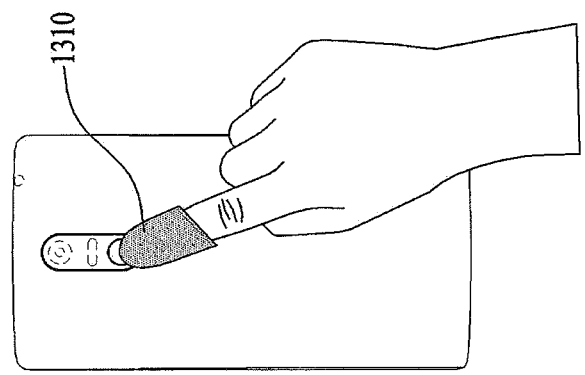

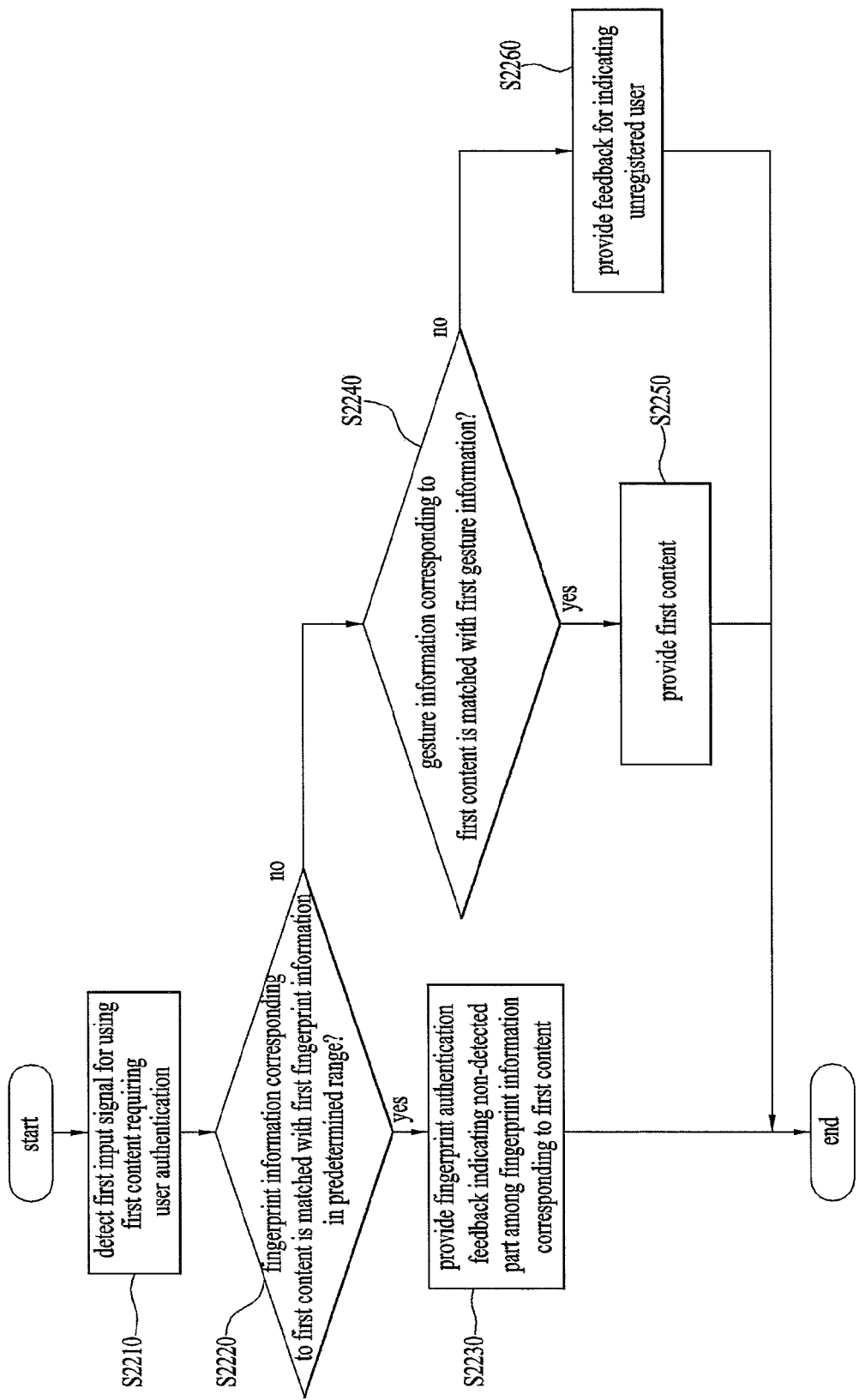

MOBILE TERMINAL AND METHOD OF CONTROLLING THEREFOR

Pursuant to 35 U.S.C. § 119(a), this application claims the benefit of the Korean Patent Application No. 10-2015-0069639, filed on May 19, 2015, which is hereby incorporated by reference as if fully set forth herein.

BACKGROUND OF THE INVENTION

Field of the Invention

The present invention relates to a mobile terminal and a method of controlling therefor.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. The mobile terminals can be further classified into handheld terminals and vehicle mounted terminals. There are ongoing efforts to support and increase the functionality of mobile terminals. Such efforts include software and hardware improvements, as well as changes and improvements in the structural components which form the mobile terminal.

Meanwhile, when a fingerprint is authenticated by a mobile terminal to use contents requiring user authentication, it is difficult for a user to recognize whether their fingerprint was recognized. Further, when a user registers contents requiring a plurality of user authentications at a mobile terminal using fingerprints different from each other, when the user actually uses each of the contents, it is difficult for the user to recall a finger used for registering the contents.

SUMMARY OF THE INVENTION

Accordingly, the present invention is directed to an apparatus and method thereof that substantially obviate one or more problems due to limitations and disadvantages of the related art.

An object of the present invention is to solve the aforementioned problem and a different problem. When a fingerprint is input, another object of the present invention is to provide a mobile terminal configured to inform a user of a non-recognized part of the fingerprint via feedback and a method of controlling therefor.

When contents are registered using fingers different from each other, another object of the present invention is to provide a mobile terminal configured to inform a user of a fingerprint of a registered finger to enable the user to use contents and a method of controlling therefor.

If a detected fingerprint is not matched with a fingerprint registered at corresponding content, the other object of the present invention is to provide a mobile terminal providing the content when a gesture input matched with a gesture input registered at the content is detected and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile terminal includes a display unit, a sensing unit configured to sense an input signal, wherein the sensing unit includes a fingerprint sensing unit and a touch sensing unit, a memory configured to store at least one fingerprint information and a controller, the controller configured to detect a first input signal for using first content requiring user authentication, wherein the first input signal includes first fingerprint information, the controller, if fingerprint information corresponding to the first content requiring the user authentication is matched with the first fingerprint information in a predetermined range, configured to compare the fingerprint information corresponding to the first content and the first fingerprint information with each other and provide a fingerprint authentication feedback indicating a non-detected part among the fingerprint information corresponding to the first content.

To further achieve these objects and other advantages and in accordance with the purpose of the invention, as embodied and broadly described herein, according to a different embodiment, a method of controlling a mobile terminal includes the steps of detecting a first input signal for using first content requiring user authentication, wherein the first input signal includes first fingerprint information and first gesture information; and if fingerprint information corresponding to the first content requiring the user authentication is not matched with the first fingerprint information in a predetermined range and the first gesture information is matched with gesture information registered at the first content, providing the first content.

Both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 6 is a diagram illustrating an example of a mobile terminal related to the present invention;

FIG. 13 is a diagram illustrating a further different example of fingerprint authentication of a mobile terminal according to one embodiment of the present invention;

FIG. 22 is a flowchart illustrating a method of controlling a mobile terminal according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
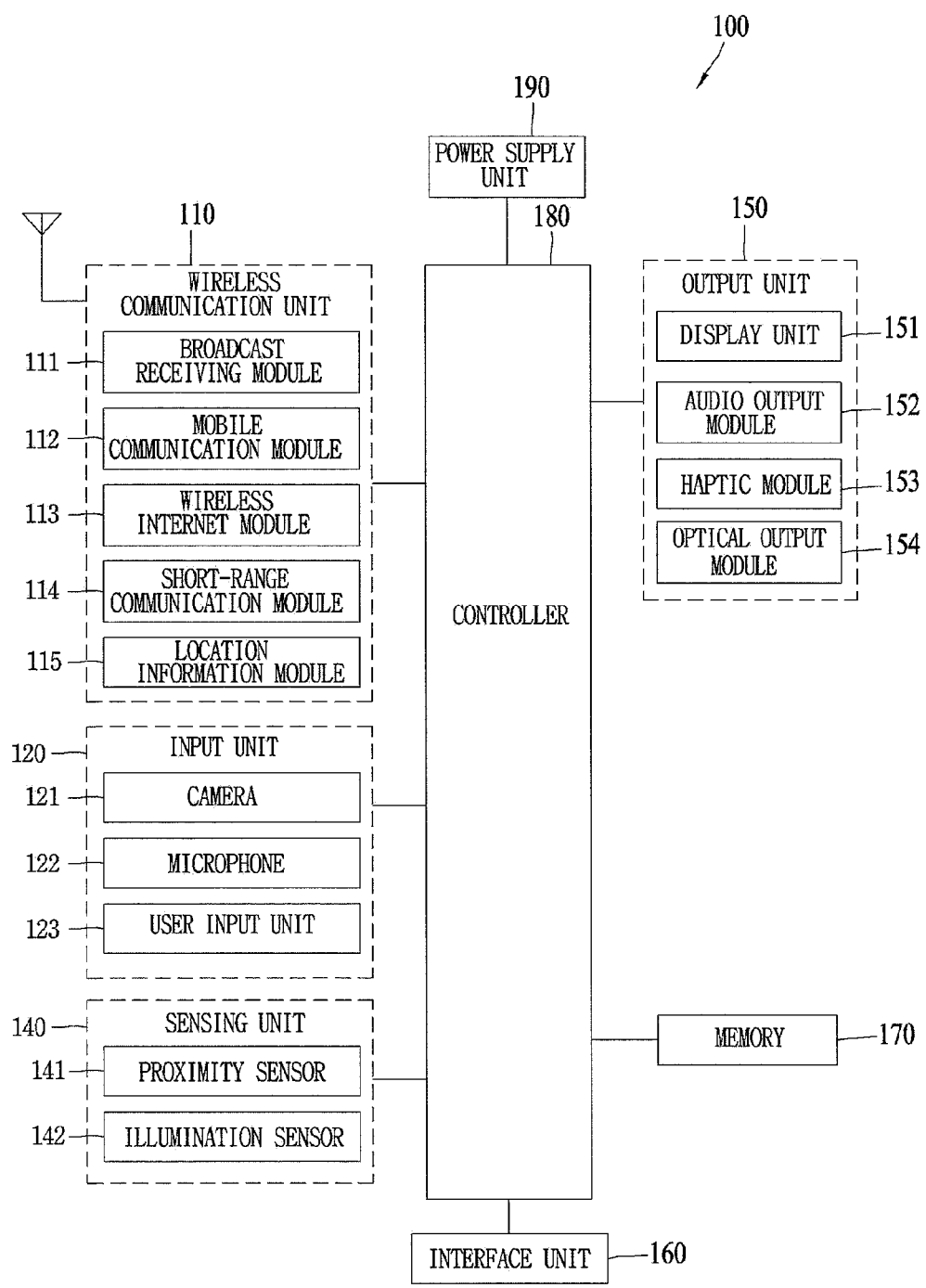
FIG. 1A is a block diagram of a mobile terminal in accordance with the present disclosure.
Figure 1B:
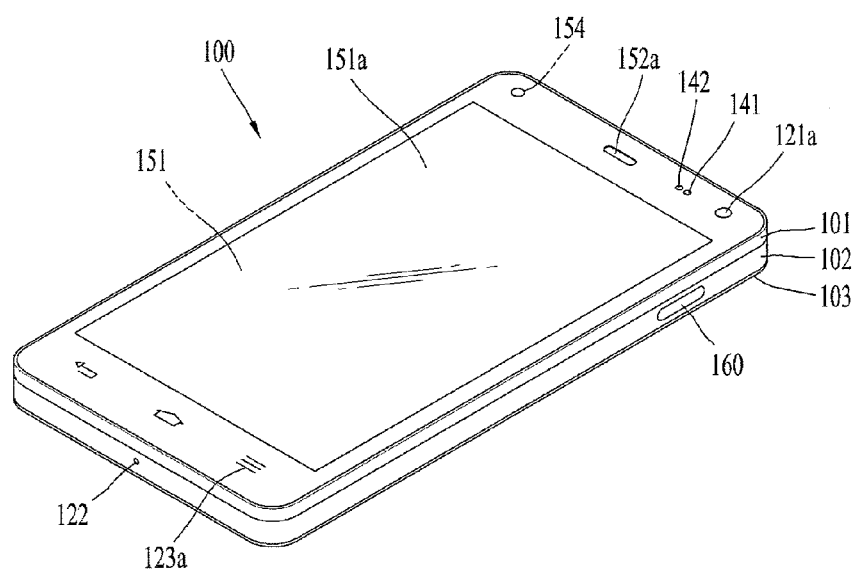
FIGS. 1B and 1C are conceptual views of one example of the mobile terminal, viewed from different directions.
Figure 1C:
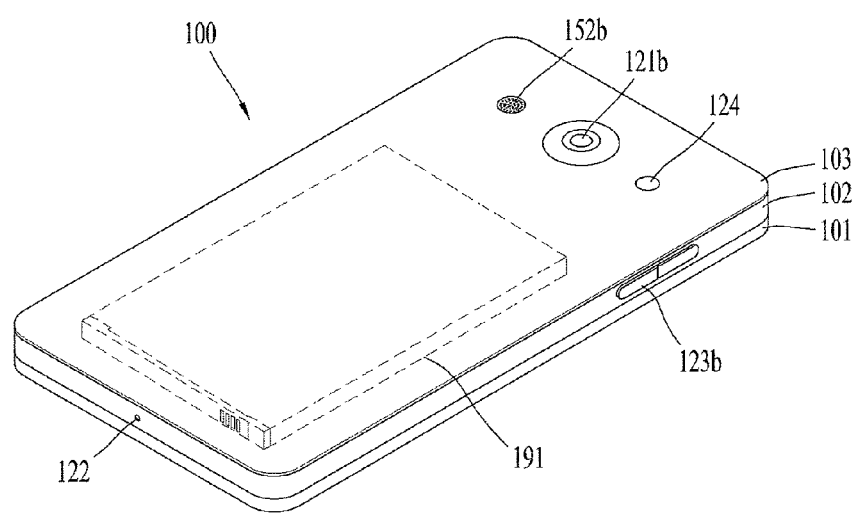

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or a function appropriate for a user by processing a signal, data, information, and the like input or output via the aforementioned configuration elements or executing an application program stored in the memory 170.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a part of the aforementioned configuration elements can operate by cooperating with each other to implement an operation of a mobile terminal, a control of the mobile terminal or a method of controlling the mobile terminal according to various embodiments described in the following. And, the operation of the mobile terminal, the control of the mobile terminal or the method of controlling the mobile terminal can be implemented on the mobile terminal by executing at least one or more application programs stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

A mobile terminal 100 can include a display unit 151, a first and second audio output unit 152*a*/152*b*, a proximity sensor 141, an illumination sensor 142, an optical output unit 154, a first and a second camera 121*a*/121*b*, a first and a second operation unit 123*a*/123*b*, a microphone 122, an interface unit 160 and the like.

FIGS. 1B and 1C depict certain components as arranged on the mobile terminal. However, alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display. The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a speaker to output voice audio, alarm sounds, multimedia audio reproduction, and the like. The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof. Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit may be located on the rear surface of the terminal body.

The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, according to an embodiment of the present invention, information processed by a mobile terminal can be displayed using a flexible display. Regarding this, it shall be described in more detail with reference to the attached drawing in the following.

Figure 2:
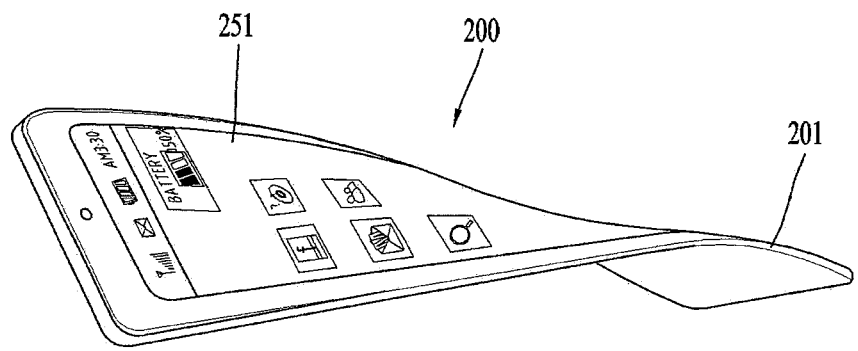
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states. One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor. The mobile terminal 200 is shown having a case 201 for accommodating the flexible display unit 251. The case 201 can be deformable together with the flexible display unit 251, taking into account the characteristics of the flexible display unit 251.

A battery located in the mobile terminal 200 may also be deformable in cooperation with the flexible display unit 261, taking into account the characteristic of the flexible display unit 251. One technique to implement such a battery is to use a stack and folding method of stacking battery cells. The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
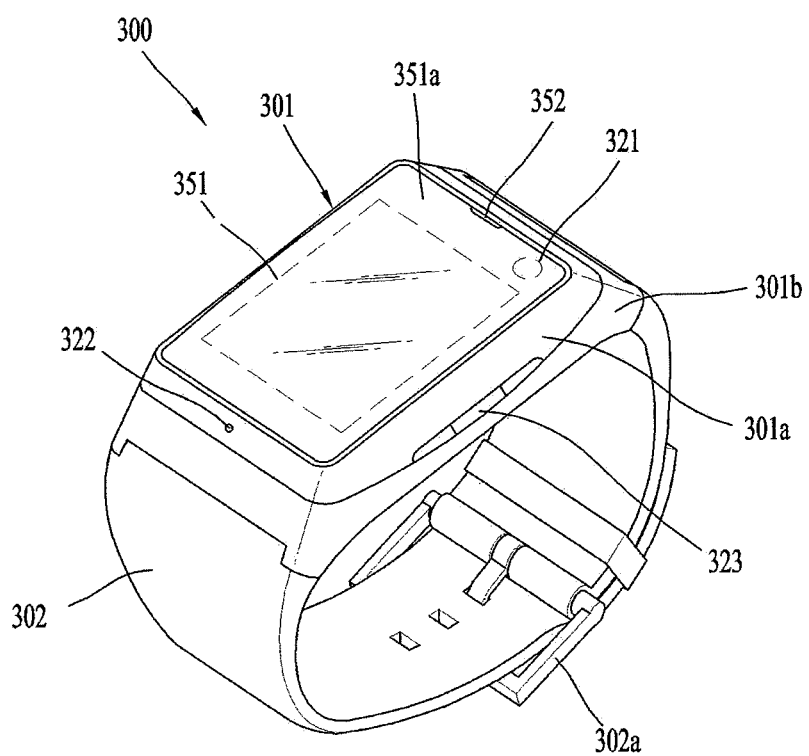
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted. The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area. The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
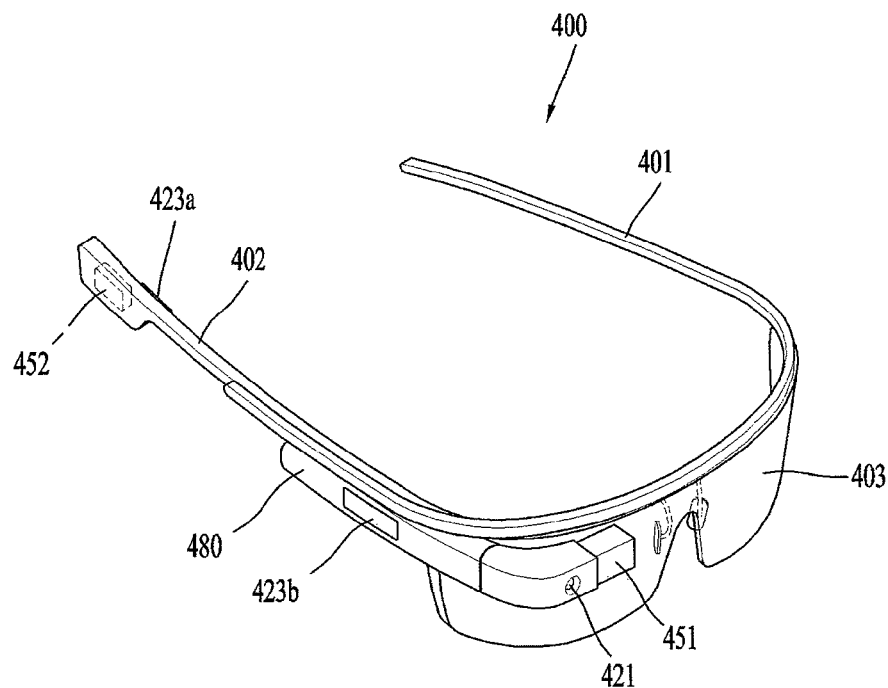
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part. The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user. In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

Further preferred embodiments will be described in more detail with reference to additional drawing figures. It is understood by those skilled in the art that the present features can be embodied in several forms without departing from the characteristics thereof.

In the following, embodiments of the present invention are explained with reference to FIG. 5 to FIG. 22. In explaining and understanding the embodiments of the present invention, it may refer to the contents mentioned earlier in FIG. 1 to FIG. 4. And, the aforementioned mobile terminal may correspond to a mobile terminal according to one embodiment of the present invention.

Figure 5:
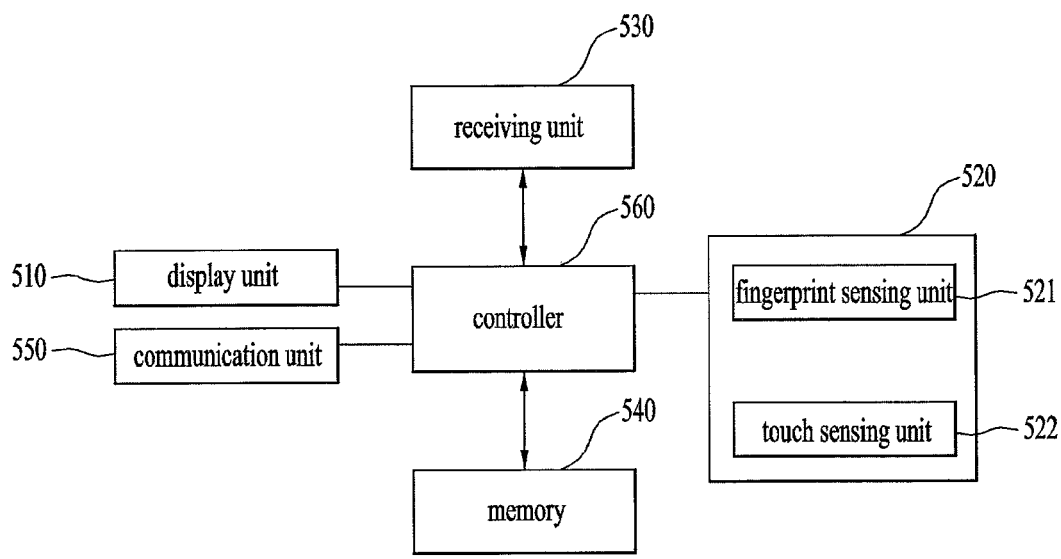
FIG. 5 is a diagram illustrating configuration modules of a mobile terminal according to one embodiment of the present invention.

FIG. 5 is a diagram illustrating configuration modules of a mobile terminal according to one embodiment of the present invention. A mobile terminal according to one embodiment of the present invention can include a display unit 510, a sensing unit 520, a haptic module 530, a memory 540, a communication unit 550, a controller 560 and the like. A configuration module shown in FIG. 5 and other configuration modules not depicted in FIG. 5 may refer to FIG. 1 to FIG. 4.

The display unit 510 can display visual information. In this instance, the visual information can include contents, an application, an image, a video and the like. And, the display unit 510 can output the visual information on a screen based on a control command of the controller 560. In the present invention, the display unit 510 can be implemented by a display unit 151 shown in FIG. 1a.

The sensing unit 520 senses various inputs of a user and environment of a mobile terminal and can deliver a sensed result to the controller to make the controller 520 perform an operation according to the sensed result. In the present invention, the sensing unit 520 can include a fingerprint sensing unit 521 and a touch sensing unit 522. The fingerprint sensing unit 521 is installed in at least one of a front side and a rear side of the mobile terminal and can sense a fingerprint input. And, the touch sensing unit 522 is installed in the front side of the mobile terminal and can sense various touch inputs, a gesture input and the like. In the present invention, the sensing unit 520 can be implemented by a sensing unit 140 shown in FIG. 1A.

The haptic module 530 can provide various tactile effects capable of being recognized by a user. And, the haptic module 530 can output a tactile effect on a device based on a control command of the controller 560. For example, the haptic module 530 can provide a user with vibration of various patterns and strength. In the present invention, the haptic module 530 can be implemented by a haptic module 153 shown in FIG. 1a.

The memory 540 can store various programs necessary for using the mobile terminal. The memory 540 stores a program for processing and controlling the controller 560 and can perform a function of temporarily storing input/output data. And, the memory 540 can be installed in the inside or outside of the mobile terminal. In the present invention, the memory 540 can be implemented by a memory 170 shown in FIG. 1A.

The communication unit 550 performs communication with an external digital device using various protocols and can transceive data with the external digital device. And, the communication unit 550 accesses a network in wired or wireless and can transceive such a digital data as contents and the like with the network. In the present invention, the communication unit 550 can be implemented by a short-range communication module 114 shown in FIG. 1A.

The controller 560 processes data, controls each of the aforementioned units of the mobile terminal and can control data to be transceived between the units. In the present invention, the controller 560 can be implemented by a controller 180 shown in FIG. 1A. According to one embodiment, the controller 560 can detect a first input signal to use first content requiring user authentication. In this instance, the first input signal can include first fingerprint information. And, if fingerprint information corresponding to the first content requiring user authentication is matched with the first fingerprint information within a predetermined range, the controller 560 compares the fingerprint information corresponding to the first content requiring user authentication and the first fingerprint information with each other and can provide a user with a fingerprint authentication feedback indicating a non-detected part among the fingerprint information. Further, according to a different embodiment, if the first fingerprint information is not matched with the fingerprint information corresponding to the first content requiring user authentication within the predetermined range and first gesture information is matched with gesture information registered at the first content, the controller 560 can provide the first content.

In one embodiment of the present invention, operations performed by the mobile terminal can be controlled by the controller 560. For clarity, assume that the operations are commonly performed or controlled by the mobile terminal in the following drawings and explanation. In addition, an external digital device may correspond to a digital device capable of performing communication access with a mobile terminal. For example, the external digital device can include a watch-type terminal shown in FIG. 2 and a glass-type terminal shown in FIG. 3. In case of performing pairing, the mobile terminal and the external digital device perform communication access and can transceive data in both directions. The pairing can be performed via Bluetooth, NFC (near field communication), and the like. In the present invention, assume that the mobile terminal is paired with the external digital device. This will be explained later with reference to FIG. 17 and FIG. 18.

FIG. 6 is a diagram illustrating an example of a mobile terminal related to the present invention. More specifically, FIG. 6 (*a*) is a front view perspective diagram illustrating a mobile terminal related to the present invention and FIG. 6 (*b*) is a rear view perspective diagram of the mobile terminal related to the present invention.

The display unit 610 is installed in the front side of the mobile terminal and can display visual information. And, the display unit 610 may form a touch screen together with a touch sensor. In this instance, the touch screen may become a user input unit. Further, the display unit 610 can sense a fingerprint of a user by mounting a fingerprint sensing unit on the display unit. And, the display unit 610 can provide a tactile effect to a user by installing a haptic module in the display unit. In the present invention, the display unit 610 can sense a fingerprint input or a gesture input of a user for using user authentication content. In addition, in the present invention, the display unit 610 can provide a haptic feedback or a visual feedback to a user.

A front side camera module 620 can capture a face of a user in case of performing video call, selfie, and the like. A rear side camera module 630 can capture a subject positioned at an angle of view of the camera. In the present invention, if an unauthenticated user intends to use the mobile terminal, the front side camera module 620 or the rear side camera module 630 can capture an image of the unauthenticated user.

A rear side input unit 640 is arranged at the bottom of the rear side camera module 630 and can receive a command for controlling an operation of the mobile terminal. Further, the rear side input unit 640 can receive such a command as power on/off, start, end, scroll and the like, a command of controlling volume of audio output from an audio output unit, a command of switching a mode to a touch recognition mode of the display unit and the like. Further, the rear side input unit 640 can sense a fingerprint of a user by mounting a fingerprint sensing unit on the rear side input unit. And, the rear side input unit 640 can provide a tactile effect to a user by installing a haptic module in the rear side input unit. In the present invention, the mobile terminal can provide a haptic feedback to a user via the haptic module mounted on the rear side input unit 640.

Meanwhile, an audio output unit can be additionally arranged at the rear side of the mobile terminal. In the present invention, the audio output unit can provide a sound feedback to a user. In the present invention, assume that the mobile terminal is implemented by an embodiment shown in FIG. 6.

Figure 7:
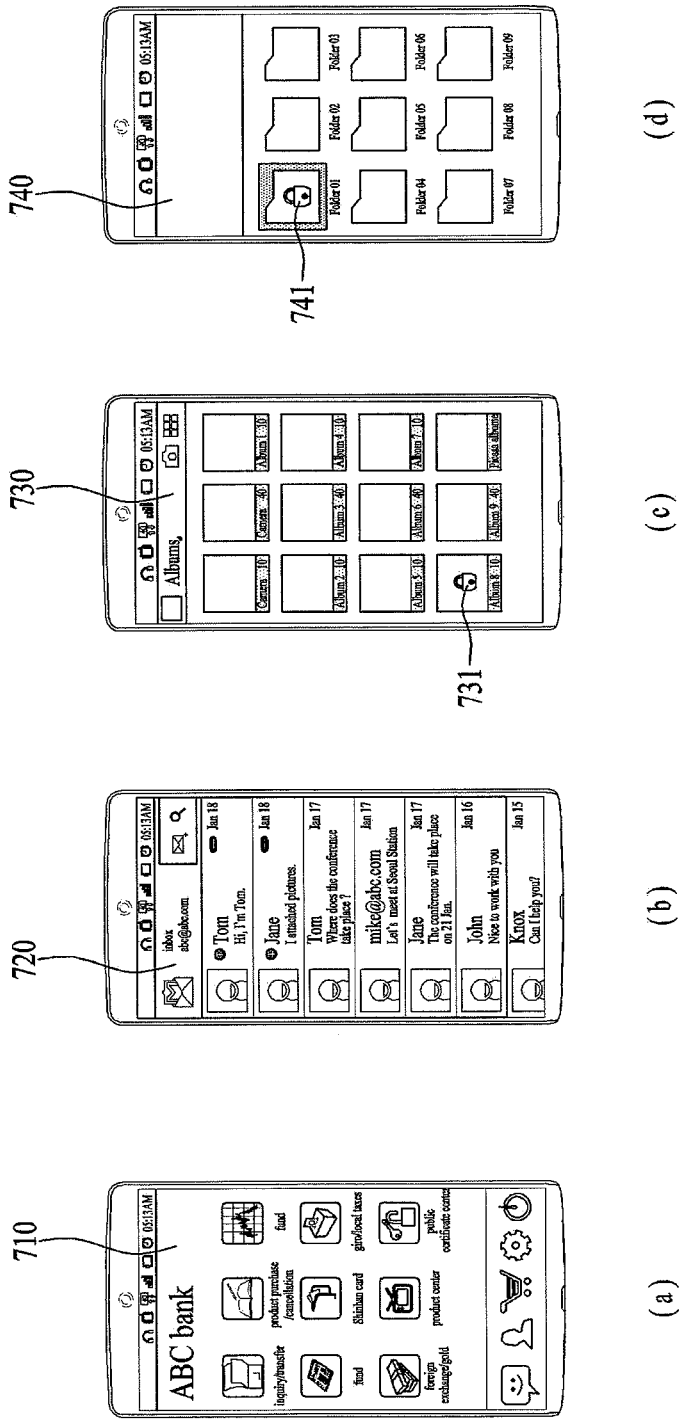
FIG. 7 is a diagram illustrating an example of content requiring user authentication of a mobile terminal according to one embodiment of the present invention.

FIG. 7 is a diagram illustrating an example of content requiring user authentication of a mobile terminal according to one embodiment of the present invention. The mobile terminal can provide various contents to a user. Yet, the various contents may include contents requiring user authentication usable for authenticated user only. This is because, since the contents requiring the user authentication includes personal information, there may exist possibility of invasion of privacy. In this instance, it may be necessary for a user to perform user authentication to use the corresponding contents.

For example, the contents requiring the user authentication may include bank contents 710 shown in FIG. 7 (*a*), e-mail contents shown in FIG. 7 (*b*), album contents 730 shown in FIG. 7 (*c*), and file contents 740 shown in FIG. 7 (*d*). Further, the contents requiring the user authentication are non-limited by the aforementioned embodiments. In this instance, the album contents shown in FIG. 7 (*c*) include a plurality of albums. Among a plurality of the albums, content 731 on which a lock is displayed corresponds to content requiring the user authentication. And, the file contents 740 shown in FIG. 7 (*d*) include a plurality of folders. Among a plurality of the folders, content on which a lock is displayed may correspond to content requiring the user authentication. Meanwhile, contents requiring the user authentication can unlock the mobile terminal for the use of the mobile terminal.

Embodiments of the present invention provide various methods of performing user authentication to use the contents requiring user authentication shown in FIG. 7 (*a*) to FIG. 7 (*d*). This will be explained with reference to FIG. 8 to FIG. 22 in the following.

Figure 8:
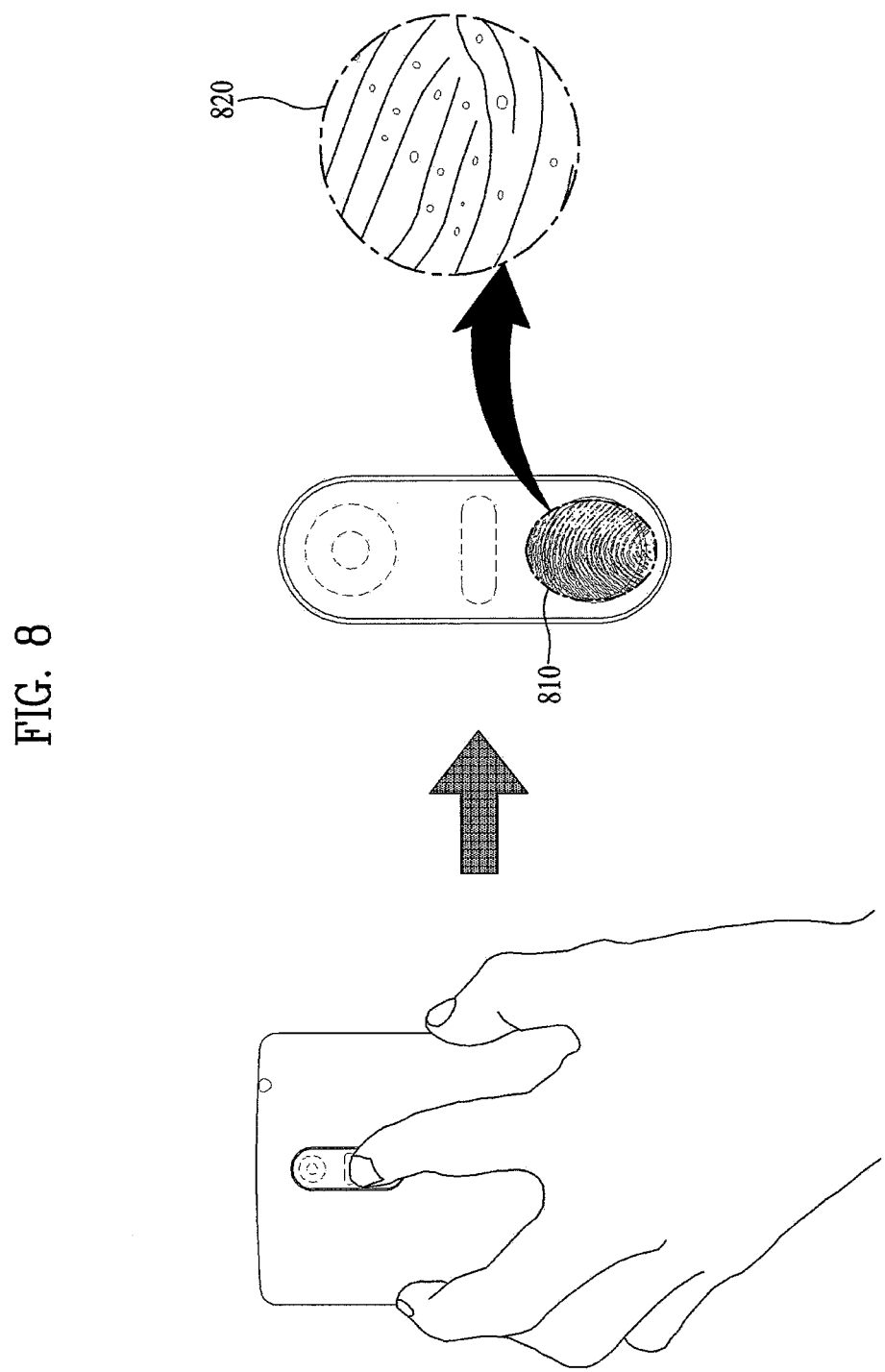
FIG. 8 is a diagram illustrating an example of a method for a mobile terminal to recognize a fingerprint according to one embodiment of the present invention.

In particular, FIG. 8 is a diagram illustrating an example of a method for a mobile terminal to recognize a fingerprint according to one embodiment of the present invention. A fingerprint corresponds to a dermatoglyph of a sweat gland higher than the surrounding. In particular, a fingerprint pattern corresponds to a pattern of the dermatoglyph of the sweat gland higher than the surrounding. According to an embodiment of the present invention, not only a fingerprint pattern of each finger but also sweat gland information is stored.

For example, the sweat gland information can include a position of the sweat gland, an amount of the sweat gland, a component of seat and the like. This is intended to make user authentication to be difficult via a copied fingerprint on the content requiring the user authentication. In relation to this, in case of such copied fingerprint information as silicon finger prosthesis and a copied fingerprint picture, the fingerprint information includes a fingerprint pattern only and information related to a sweat glad is not included in the fingerprint information. Further, for the copied fingerprint information, although the fingerprint information includes the information related to the sweat gland, the information related to the sweat gland may be unmatched with the sweat gland information included in real fingerprint information. Hence, the user authentication contents can be securely protected from the copied fingerprint information by including not only the fingerprint pattern but also the sweat gland information in the fingerprint information.

First of all, as shown in a first drawing of FIG. 8, the mobile terminal can detect a fingerprint input of a user input on the rear side input unit. In addition, a fingerprint input of a user can be detected on a display unit positioned at the front side of the mobile terminal. Subsequently, as shown in a second drawing of FIG. 8, the mobile terminal can recognize a fingerprint 810 of a user. In this instance, as shown in a third drawing of FIG. 8, the mobile terminal can recognize sweat gland information 820 as well as a pattern of the fingerprint of the user. Further, the mobile terminal makes fingerprint information including the fingerprint pattern and the sweat gland information as data according to each finger and can store the data.

Meanwhile, the fingerprint sensing unit included in the mobile terminal can sense a fingerprint in various ways. In one embodiment, the mobile terminal can include an optical fingerprint sensing unit configured to obtain light refraction information of a point with which sweat is contacted. In another embodiment, the mobile terminal can include an ultrasonic fingerprint sensing unit configured to obtain sweat gland position information of a dermis layer using ultrasonic waves. In another embodiment, the mobile terminal can include a capacitive fingerprint sensing unit using a charge quantity difference between a point with which sweat is contacted and a skin epidermis. In another embodiment, the mobile terminal can include a fingerprint sensing unit combined with a bio sensor using information of which component of sweat is analyzed.

Figure 9:
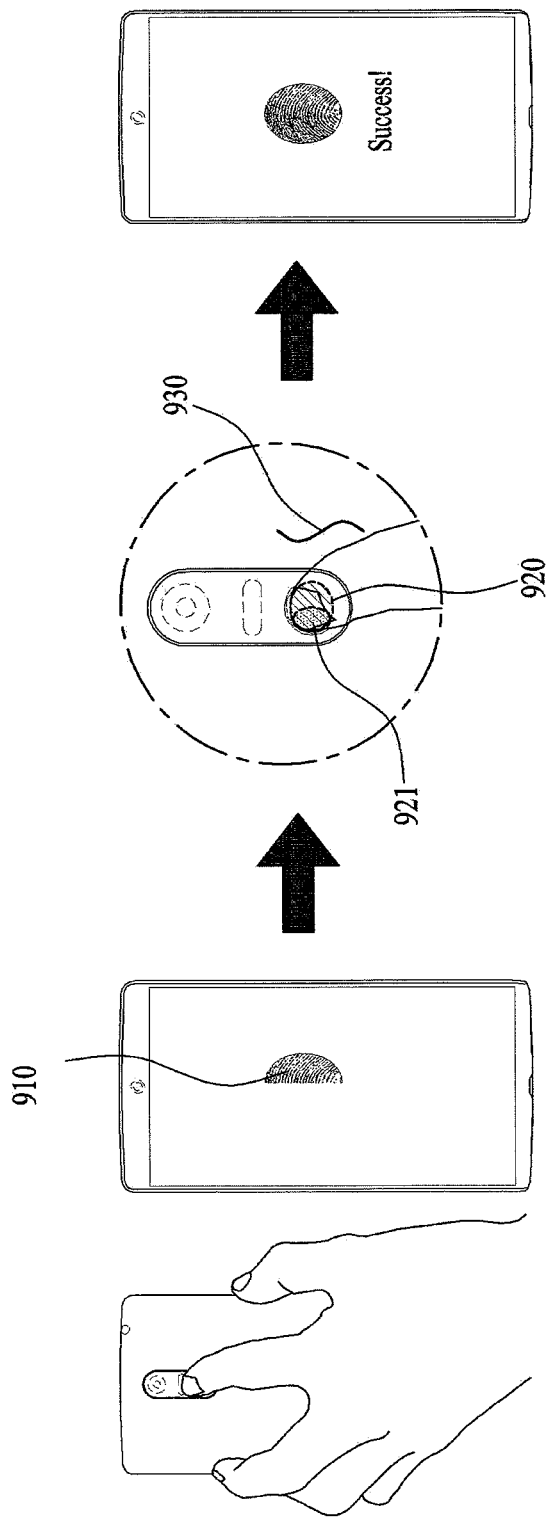
FIG. 9 is a diagram illustrating an example of a method for a mobile terminal to register a fingerprint according to one embodiment of the present invention.

FIG. 9 is a diagram illustrating an example of a method for a mobile terminal to register a fingerprint according to one embodiment of the present invention. The mobile terminal provides a user with a fingerprint registration interface and can induce the user to register a fingerprint. For example, the fingerprint registration interface can be provided to the user when content requiring user authentication is firstly used or the mobile terminal is firstly used. Further, the fingerprint registration interface can be provided upon a registration request of the user.

In order to use the mobile terminal when security is maintained, a user can register a fingerprint on the fingerprint registration interface. For example, the user can register a fingerprint to unlock the mobile terminal. In addition, for example, the user can register a fingerprint to use contents requiring security among a plurality of contents of the mobile terminal. In this instance, the user can register fingerprint information on each finger instead of fingerprint information on a single finger. And, the user may register fingerprint information by differently designating contents according to each finger.

Referring to FIG. 9, the mobile terminal can detect a fingerprint input of a single finger among a plurality of fingers of the user on the fingerprint registration interface. For example, as shown in a first drawing of FIG. 9, the mobile terminal can detect a fingerprint input via a fingerprint sensing unit mounted on the rear side input unit. In this instance, as shown in the first drawing of FIG. 9, the mobile terminal can recognize a part of fingerprint information 910 of a left index finger. For example, if a finger of the user is not completely contacted with the mobile terminal or the mobile terminal is unable to completely recognize a finger of the user, a part of the fingerprint information 910 is recognized. In particular, as shown in a second drawing of FIG. 9, the mobile terminal can recognize a part 921 of the whole of a fingerprint 920 of the left index finger only.

In this instance, the mobile terminal can provide the user with a feedback indicating that a fingerprint input is incomplete. For example, the mobile terminal can induce the user to input a correct fingerprint by providing a haptic feedback 930 to the user. More specifically, the mobile terminal can induce the user to perform the fingerprint input on a corresponding area once again by providing vibration to a side on which a fingerprint of a finger is not recognized only. In particular, as shown in a second drawing of FIG. 9, the mobile terminal provides vibration 930 to a direction of the rest of area except the recognized part 921 of the fingerprint 920 of the index finger and can inform that the fingerprint input is incomplete.

Hence, as shown in a third drawing of FIG. 9, the mobile terminal can succeed in registering a fingerprint via an additional fingerprint input. By doing so, the user can easily perform the fingerprint registration by contacting the non-recognized part only without contacting a finger many times. Also, the user can easily recognize a non-recognized part of a fingerprint via a haptic feedback without watching the display unit.

Figure 10:
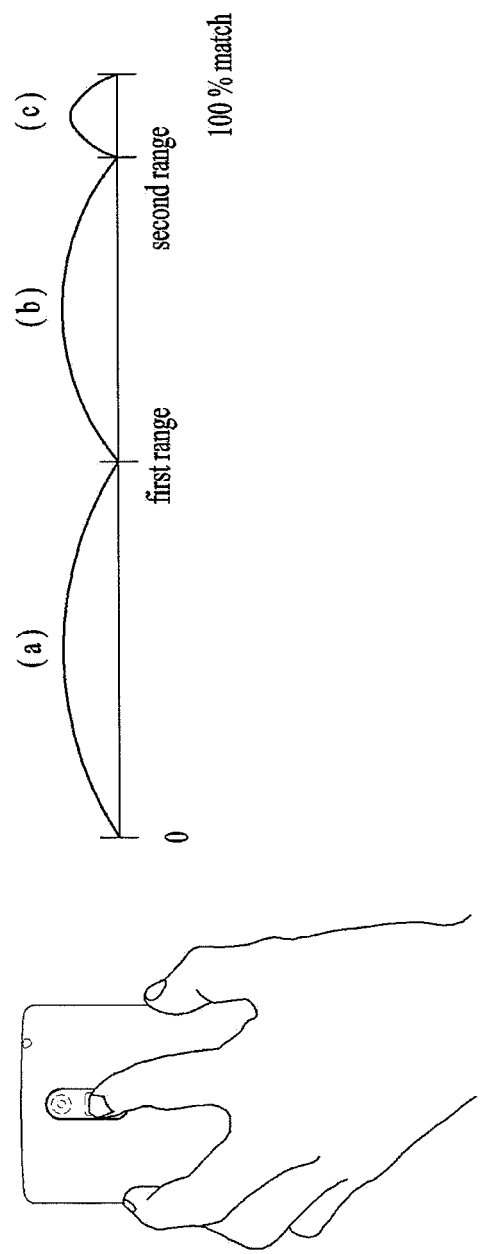
FIG. 10 is a diagram illustrating an example of a fingerprint matching range of a mobile terminal according to one embodiment of the present invention.

When a fingerprint signal is detected on contents requiring user authentication and a part of the fingerprint input signal is not recognized, a method of providing various feedbacks to induce a user to perform precise fingerprint authentication is explained in the following with reference to FIG. 10 to FIG. 18. In particular, FIG. 10 is a diagram illustrating an example of a fingerprint matching range of a mobile terminal according to one embodiment of the present invention.

The mobile terminal can detect a first input signal of a user for using first content requiring user authentication. In this instance, the first content corresponds to content requiring user authentication and can include the bank contents, the e-mail contents and the like mentioned earlier in FIG. 7. In addition, the first input signal can include first fingerprint information. In particular, the first input signal may indicate a fingerprint input of a user. As mentioned earlier in FIG. 8, the first fingerprint information can include a pattern of a fingerprint and sweat gland information.

In this instance, the mobile terminal can determine whether fingerprint information corresponding to the first content is matched with the first fingerprint input signal. For example, the fingerprint information corresponding to the first content may correspond to fingerprint information registered at the mobile terminal in advance to use the first content. As mentioned earlier in FIG. 8, the fingerprint information registered at the mobile terminal can include a fingerprint pattern and sweat gland information.

In one embodiment, the fingerprint information corresponding to the first content requiring user authentication and the first fingerprint information can be matched with each other in a fingerprint unmatching range (a). As shown in FIG. 10, the fingerprint unmatching range (a) may correspond to a range not exceeding a first range. For example, the first range may correspond to a minimum range capable of determining whether the fingerprint information corresponding to the first content is identical to the first fingerprint information. In particular, if the fingerprint information corresponding to the first content is matched with the first fingerprint information in a range smaller than the first range, the mobile terminal can determine it as the first fingerprint information is completely different from the fingerprint information corresponding to the first content requiring user authentication. Also, if a ratio of matching between the fingerprint information corresponding to the first content and the first fingerprint information is higher than the first range, the mobile terminal can determine it as a part of a fingerprint input of a user is matched with the fingerprint information corresponding to the content requiring user authentication.

In another embodiment, the fingerprint information corresponding to the content requiring user authentication and the first fingerprint input signal can be matched with each other in a predetermined range (b). As shown in FIG. 10, the predetermined range (b) may correspond to a matching range between the first range and the second range. For example, the second range corresponds to a range of which a ratio of matching is higher than that of the first range.

Meanwhile, the second range may correspond to a range capable of determining that the fingerprint information corresponding to the first content requiring user authentication is practically identical to the first fingerprint information. In case of a fingerprint input, the fingerprint input may change according to various environmental conditions including a status of a finger of a user, a status of a device for authentication and the like. Hence, although the fingerprint information corresponding to the content requiring user authentication is not completely identical to the first fingerprint information, if it exceeds the second range, the mobile terminal can determine it as the fingerprint input of the user is identical to the fingerprint information. In particular, the predetermined range (b) can indicate a range capable of determining that the first fingerprint information corresponds to at least one or more fingerprint information registered at the mobile terminal, although the fingerprint information corresponding to the first content is not completely identical to the first fingerprint information.

In another embodiment, the fingerprint information corresponding to the first content requiring user authentication and the first fingerprint information can be matched with each other in a fingerprint matching range (c). As mentioned in the foregoing description, if the fingerprint information corresponding to the first content requiring user authentication and the first fingerprint information are matched with each other in a range exceeding the second range, the mobile terminal can determine it as a practically identical fingerprint.

Meanwhile, the fingerprint matching range of FIG. 10 can be applied not only to a relation between the fingerprint information of the first content requiring user authentication and the first fingerprint information but also to a relation between at least one fingerprint information registered at the mobile terminal and the first fingerprint information. In the following, a method of authenticating a fingerprint input on the first content is explained based on a matching ratio between the fingerprint information of the first content requiring user authentication and the first fingerprint information mentioned earlier in FIG. 10.

Figure 11:
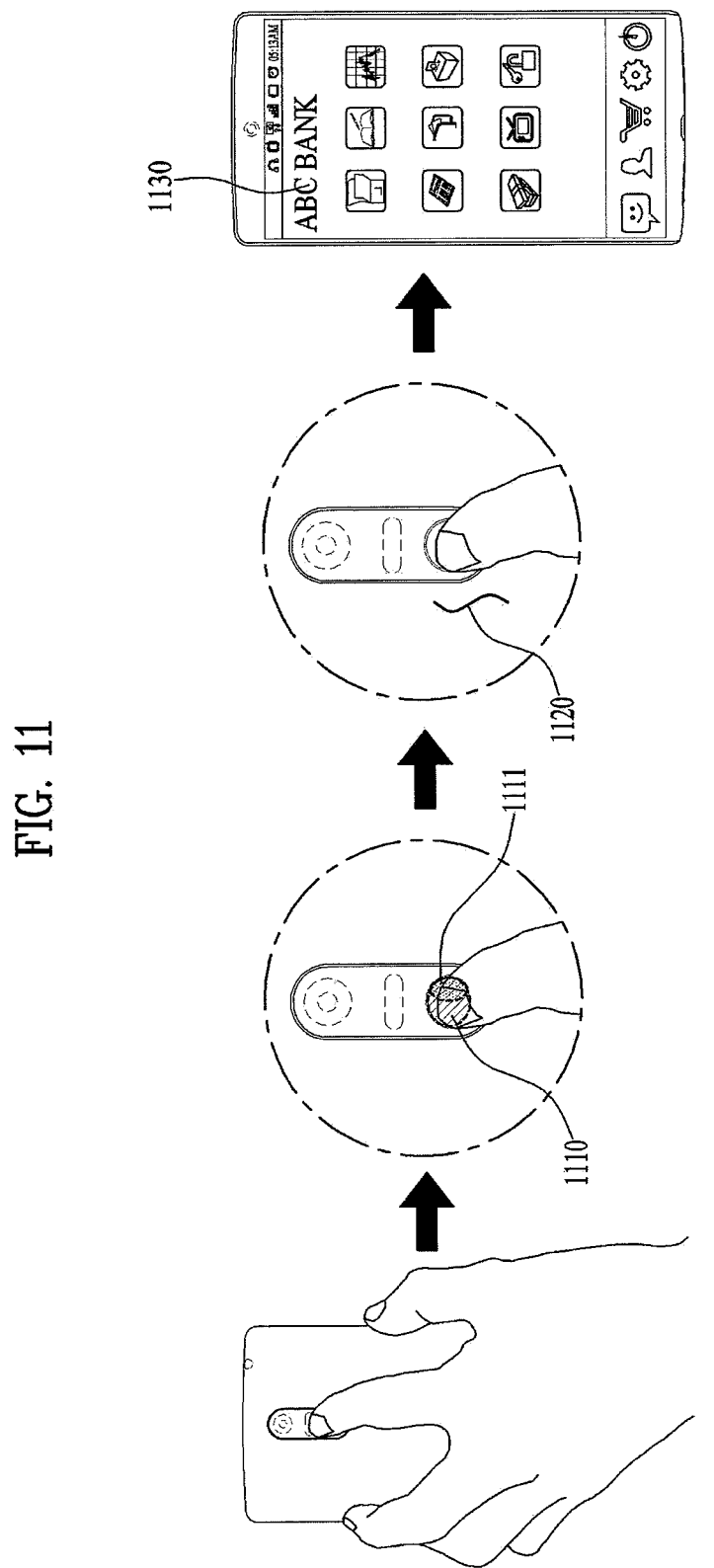
FIG. 11 is a diagram illustrating an example of fingerprint authentication of a mobile terminal according to one embodiment of the present invention.

FIG. 11 is a diagram illustrating an example of fingerprint authentication of a mobile terminal according to one embodiment of the present invention. First of all, the mobile terminal can detect a first input signal for using first content. In this instance, the first input signal can include first fingerprint information. As shown in FIG. 11, the mobile terminal can detect the first input signal via a fingerprint sensing unit mounted on a rear side input unit. For example, as shown in a first drawing of FIG. 11, the first fingerprint information may correspond to fingerprint information corresponding to a fingerprint of a left index finger.

Subsequently, the mobile terminal can determine whether fingerprint information corresponding to the first content requiring user authentication is matched with the first fingerprint information in a predetermined range. As mentioned earlier in FIG. 10, the predetermined range may correspond to a range matching between the first range and the second range. As shown in a second drawing of FIG. 11, the mobile terminal can detect a part 1111 of the fingerprint 1110 of the left index finger only. In this instance, assume that the part of the fingerprint belongs to the predetermined range.

In this instance, the mobile terminal compares the fingerprint information corresponding to the first content requiring user authentication and the first fingerprint information with each other and can provide a fingerprint authentication feedback indicating a non-detected part among the fingerprint information corresponding to the first content. As shown in a third drawing of FIG. 11, the mobile terminal can provide a haptic feedback 1120 to a left part of the left index finger only to indicate that the left part of the fingerprint 1110 of the left index finger is not detected. In addition, the mobile terminal can provide a visual feedback to a front side display unit to indicate that the left part of the fingerprint of the left index finger is not detected. For example, the mobile terminal can provide such a notification message as 'Please precisely contact left area' to the front side display unit. Also, the mobile terminal can provide such a sound feedback as 'Please precisely contact left area' via an audio output unit to indicate that the left part of the fingerprint of the left index finger is not detected. The mobile terminal can also provide a plurality of feedbacks with which the aforementioned feedbacks are combined to a user at the same time.

Subsequently, the mobile terminal can detect a second input signal corresponding to a fingerprint authentication feedback. In this instance, the second input signal can include second fingerprint information. For example, the second fingerprint information may correspond to an area except a right part 1111 detected by the first fingerprint information among the fingerprint 1110 of the left index finger.

In this instance, if fingerprint information extracted from the first input signal and the second input signal is matched with fingerprint information registered at the first content requiring user authentication, the mobile terminal can provide the first content 1130 requiring user authentication. For example, if the extracted fingerprint information is matched with the fingerprint information registered at the first content in a range exceeding the second range mentioned earlier in FIG. 10, the mobile terminal can provide the first content 1130 to a user. As shown in a fourth drawing of FIG. 11, the first content 1130 requiring user authentication corresponds to bank contents. If the user authentication is completed via a fingerprint input, the mobile terminal can provide the bank contents to a user.

In addition, if the fingerprint information extracted from the first input signal and the second input signal is still not matched with the fingerprint information registered at the first content requiring user authentication, the mobile terminal may provide an additional fingerprint authentication feedback. For example, the additional fingerprint authentication feedback can include a haptic feedback, a sound feedback, a visual feedback and the like indicating a non-detected part. In particular, if a fingerprint input of a user is not matched with fingerprint information registered at corresponding content in an identical range, the mobile terminal provides a fingerprint authentication feedback to the user several times and can induce the user to perform precise fingerprint authentication.

Figure 12:
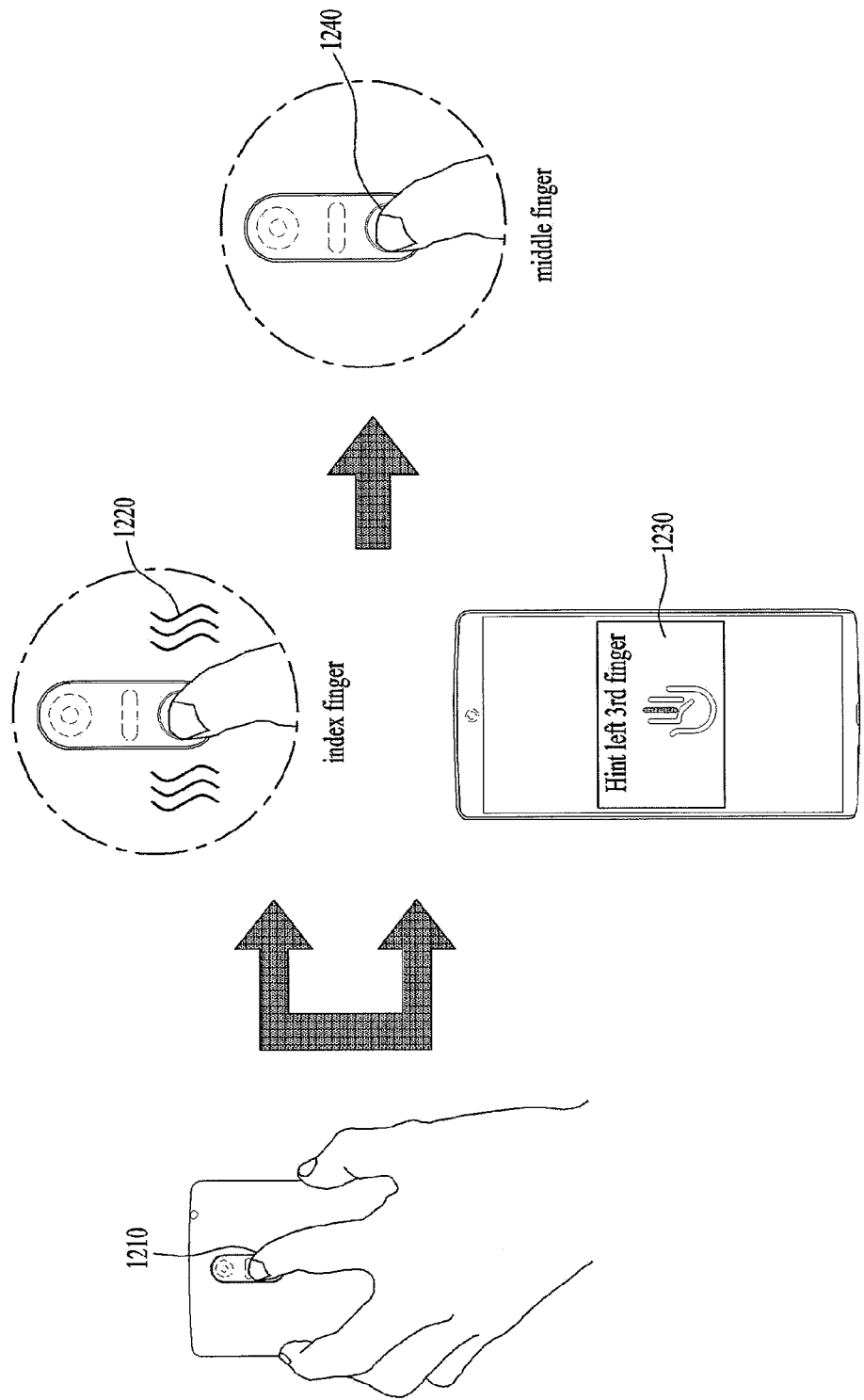
FIG. 12 is a diagram illustrating a different example of fingerprint authentication of a mobile terminal according to one embodiment of the present invention.

Next, FIG. 12 is a diagram illustrating a different example of fingerprint authentication of a mobile terminal according to one embodiment of the present invention. First of all, as mentioned earlier in FIG. 11, the mobile terminal can detect a first input signal 1210 for using first content requiring user authentication. For example, the first input signal 1210 may correspond to fingerprint information of a left index finger. Subsequently, the mobile terminal can determine whether fingerprint information corresponding to the first content requiring user authentication is matched with first fingerprint information in a predetermined range. Referring to an embodiment of FIG. 12, the fingerprint information corresponding to the first content is matched with the first fingerprint information in a range smaller than a first range. As mentioned earlier in FIG. 10, if the fingerprint information corresponding to the first content is matched with the first fingerprint information in the range smaller than the first range, it may indicate that the fingerprint information corresponding to the first content is not matched with the first fingerprint information in the range. In particular, in the embodiment of FIG. 12, the first fingerprint information corresponds to a left index finger and the fingerprint information corresponding to the first content may correspond to a left middle finger.

In this instance, the mobile terminal can determine whether the first fingerprint information corresponds to at least one fingerprint information registered at the mobile terminal. This is intended to induce a user to precisely input a fingerprint to the mobile terminal and enable the user to use contents requiring security if the user is an authenticated user by the mobile terminal, although the first fingerprint information does not correspond to the fingerprint information corresponding to the content requiring user authentication. Further, in the embodiment of FIG. 12, the mobile terminal may preferentially determine whether the first fingerprint information corresponds to at least one fingerprint information registered at the mobile terminal and then determine whether the first fingerprint information is matched with the fingerprint information of the first content requiring user authentication in a predetermined range.

In the embodiment of FIG. 12, the mobile terminal can determine that the first fingerprint information is matched with at least one fingerprint information registered at the mobile terminal in a predetermined range. Further, in the embodiment of FIG. 12, the mobile terminal can determine that the first fingerprint information is practically identical to the at least one fingerprint information registered at the mobile terminal. Hence, since a user corresponds to a user authenticated by the mobile terminal, the mobile terminal can induce the user to input a fingerprint corresponding to the first content to the mobile terminal to enable the user to use the content requiring user authentication.

Subsequently, the mobile terminal can provide feedback 1220/1230 to a user to induce the user to input a fingerprint of a finger corresponding to the fingerprint information, which corresponds to the content requiring user authentication. In particular, in the embodiment of FIG. 12, the mobile terminal can provide the user with a feedback to induce the user to input a fingerprint of a left middle finger. In this instance, the feedback for inducing the fingerprint input can be provided in a form of a haptic feedback or a visual feedback. For example, as shown in a second drawing of FIG. 12, the mobile terminal can induce the user to input a fingerprint of a left middle finger to the mobile terminal by providing three vibrations 1220 to a rear side input unit. In particular, the mobile terminal can induce the user to input the fingerprint of the left middle finger to the mobile terminal by providing three vibrations such as 'tap tap tap' to the rear side input unit. And, for example, as shown in a second drawing of FIG. 12, the mobile terminal can induce the user to input the fingerprint of the left middle finger to the mobile terminal by providing a visual indicator 1230 to a front side display unit.

By doing so, the mobile terminal can detect a fingerprint input of a finger matched with fingerprint information corresponding to first content requiring user authentication from a user. Referring to a third drawing of FIG. 12, the mobile terminal can detect a fingerprint input 1240 of a left middle finger of a user. In this instance, the mobile terminal can provide the first content to the user. In addition, as mentioned earlier in FIG. 7, the first content can include bank contents, e-mail contents and the like.

Meanwhile, when the fingerprint input of the left middle finger is detected, if a part of fingerprint information of the left middle finger is not detected, the mobile terminal can additionally induce the user to precisely input a fingerprint to the mobile terminal by providing a separate feedback to the user. According to the aforementioned embodiments, although an initial fingerprint input of a user does not correspond to fingerprint information corresponding to contents, if the user corresponds to a user registered at the mobile terminal, the mobile terminal can induce the user to precisely input a fingerprint to the mobile terminal and enable the user to use the contents.

Next, FIG. 13 is a diagram illustrating a further different example of fingerprint authentication of a mobile terminal according to one embodiment of the present invention. First of all, as mentioned earlier in FIG. 11, the mobile terminal can detect a first input signal for using first content requiring user authentication. In an embodiment of FIG. 13, the first input signal may correspond to a fingerprint input signal input by a replica 1310 of a copied fingerprint. In addition, the first input signal may correspond to a fingerprint input signal input by a copied fingerprint picture. In this instance, as mentioned earlier in FIG. 8, although a pattern of a fingerprint is detected from the fingerprint input signal, sweat gland information of fingerprint information of a proper user may not be accurately detected from the fingerprint input signal.

Subsequently, the mobile terminal can determine whether fingerprint information corresponding to content requiring user authentication is matched with first fingerprint information in a predetermined range. In an embodiment of FIG. 13, the first fingerprint information corresponds to a fingerprint input signal input by a replica of a copied fingerprint.

In this instance, the first fingerprint information can be matched with fingerprint information corresponding to first content in a range smaller than a first range. In this instance, the mobile terminal can determine whether the first fingerprint information corresponds to at least one fingerprint information registered at the mobile terminal. In the embodiment of FIG. 13, since the first fingerprint information corresponds to the fingerprint input signal input by the replica of the copied fingerprint, the first fingerprint information does not correspond to the at least one fingerprint information registered at the mobile terminal.

Hence, the mobile terminal can provide a user with a feedback indicating that the user is not a registered user. In this instance, the feedback indicating the unregistered user can include a sound feedback, a camera feedback, a visual feedback and the like. For example, referring to a second upper drawing of FIG. 13, the mobile terminal displays such a message as "You are not an authorized user!" on a front side display unit, provides warning sound to a user and can block access of the improper user. Also, for example, referring to the second lower drawing of FIG. 13, the mobile terminal automatically executes a camera application and can capture a face of the improper user via a front side camera. By doing so, the improper user can be easily identified.

Meanwhile, the embodiment of FIG. 13 can be used not only for the first content requiring user authentication but also for unlocking the mobile terminal. More specifically, if first fingerprint information is matched with at least one fingerprint information registered at the mobile terminal in a range smaller than a first range, the mobile terminal can provide a user with the aforementioned feedback indicating that the user is not a registered user. According to the aforementioned embodiments, if an improper user attempts to use contents requiring user authentication, the mobile terminal can block access of the user to the mobile terminal by providing various feedbacks to the user.

Figure 14:
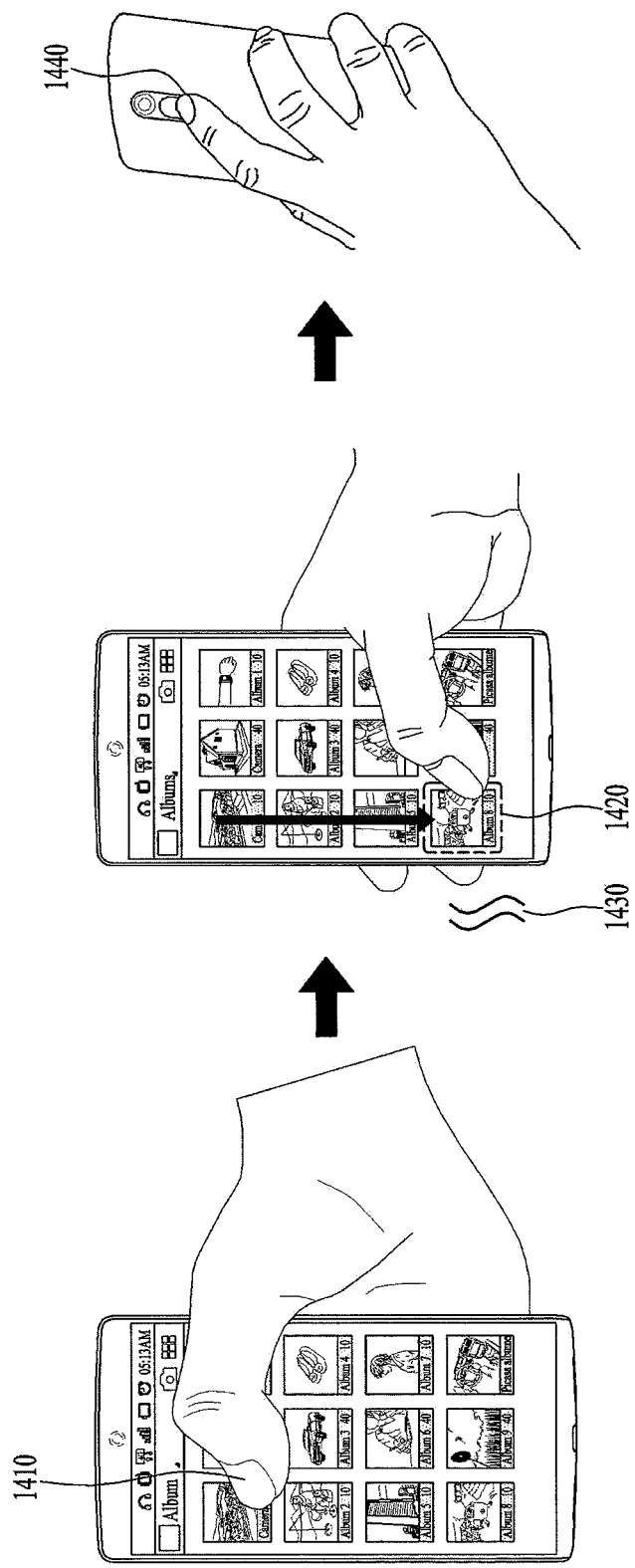
FIG. 14 is a diagram illustrating a different example of user authentication of a mobile terminal according to one embodiment of the present invention.

FIG. 14 is a diagram illustrating a different example of user authentication of a mobile terminal according to one embodiment of the present invention. More specifically, FIG. 14 is a diagram illustrating a method of searching for contents requiring user authentication when a plurality of contents are displayed on a display unit of the mobile terminal. This is intended to induce a user to input registered fingerprint information to the mobile terminal when fingerprint information different from each other are respectively registered at a plurality of contents, because it is difficult for the user to remember the fingerprint information different from each other registered at a plurality of the contents.

First of all, the mobile terminal can detect a first input signal for using first content requiring user authentication. Referring to FIG. 14, when a plurality of album contents are displayed, the mobile terminal can detect a first input signal 1410 of a user dragging in a down direction. In this instance, when a plurality of contents are displayed, the first input signal 1410 of the user may correspond to an input for distinguishing contents requiring user authentication from a plurality of the contents. Also, the first input signal 1410 can include fingerprint information. In addition, the first input signal 1410 can include various gesture input including a drag input, a hovering input and the like. Also, in FIG. 14, the first input signal 1410 may correspond to a fingerprint of a right thumb.

In this instance, the mobile terminal can determine whether fingerprint information corresponding to the first content requiring user authentication is matched with first fingerprint information in a predetermined range. For example, if the fingerprint information corresponding to the first content is matched with the first fingerprint information in a range exceeding a second range, the mobile terminal regards it as the user authentication is completed via the first fingerprint information and can provide the content requiring user authentication to a user. For example, if the fingerprint information corresponding to the first content is matched with the first fingerprint information in a predetermined range, as mentioned earlier in FIG. 11, the mobile terminal can induce a user to input an additional fingerprint to the mobile terminal by providing a fingerprint authentication feedback to the user. In this instance, the mobile terminal can detect fingerprint information on a front side display unit.

However, if the fingerprint information corresponding to the first content requiring user authentication is matched with the first fingerprint information in a range smaller than a first range, the mobile terminal can determine whether a user corresponds to a user registered at the mobile terminal based on the first input signal. Referring to FIG. 14, the mobile terminal can determine whether fingerprint information of a right thumb detected from the first fingerprint information corresponds to a fingerprint registered at the mobile terminal. If the first fingerprint information corresponds to the fingerprint registered at the mobile terminal, the mobile terminal can induce a user to input a fingerprint of a finger corresponding to the fingerprint information, which corresponds to the first content, to the mobile terminal by providing a haptic feedback 1430 to the user. For example, referring to an embodiment of FIG. 14, when a right thumb of a user is contacted with the first content 1420, the mobile terminal provides the user with a vibration feedback such as 'tap tap' and can inform that fingerprint information corresponding to the first content 1420 corresponds to the right thumb. Also, the mobile terminal can induce a user to input fingerprint information corresponding to the first content 1420 by providing the user with a visual feedback or a sound feedback.

Hence, as shown in a third drawing of FIG. 14, the mobile terminal can detect a second input signal 1440 on a rear side input unit. In this instance, the second input signal 1440 may correspond to an input by a right index finger. Also, if second fingerprint information included in the second input signal corresponds to fingerprint information corresponding to the first content 1420, the mobile terminal can provide the first content 1420 to the user.

According to the aforementioned embodiments, although a user is unable to remember a finger, which is used for registering fingerprint information corresponding to content requiring user authentication at the mobile terminal, the user can input proper fingerprint information to the mobile terminal via various feedbacks such as a haptic feedback and the like.

Figure 15:
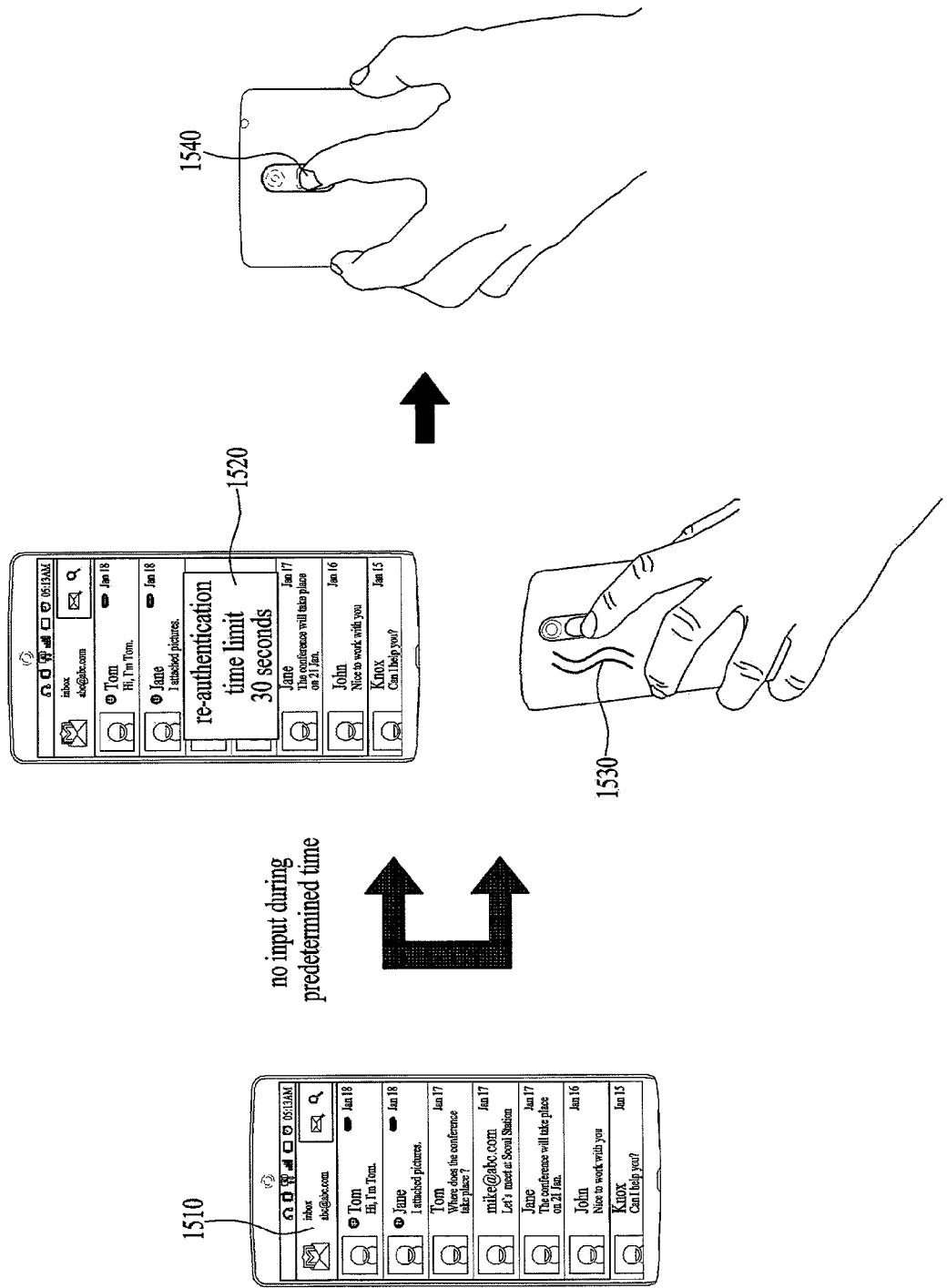
FIG. 15 is a diagram illustrating an example of user re-authentication of a mobile terminal according to one embodiment of the present invention.

FIG. 15 is a diagram illustrating an example of user re-authentication of a mobile terminal according to one embodiment of the present invention. The mobile terminal can provide a user with first content 1510 requiring user authentication via initial authentication of the user. In an example of FIG. 15, the first content 1510 requiring user authentication may correspond to e-mail contents. In this instance, an input signal of the user may not be input on the mobile terminal for more than predetermined time. For example, if the user leaves the mobile terminal for the predetermined time while using e-mail, absence of an input signal for the first content 1510 requiring user authentication may occur during the predetermined time. For example, the predetermined time may correspond to 5 minutes.

In this instance, the mobile terminal can provide a feedback inducing user re-authentication to the user. The feedback inducing the user re-authentication can include a visual feedback, a haptic feedback, a sound feedback and the like. For example, as shown in a second upper drawing of FIG. 15, the mobile terminal can induce the user to perform the re-authentication by providing such a visual feedback 1520 as "re-authentication time limit 30 seconds" to a front side display. And, for example, as shown in the second lower drawing of FIG. 15, the mobile terminal can induce the user to perform the re-authentication by providing a haptic feedback 1530 such as vibration to a rear side input unit. In particular, the mobile terminal can induce the user to perform the re-authentication using an index finger via two vibrations such as 'tap tap'.

Subsequently, the mobile terminal can detect an input signal 1540 for the re-authentication. If the input signal 1540 for the re-authentication is practically matched with fingerprint information corresponding to the first content 1510 requiring user authentication, the mobile terminal can continuously provide the first content 1510 requiring user authentication to a user. And, if the input signal 1540 for the re-authentication is matched with the fingerprint information corresponding to the first content 1510 requiring user authentication in a predetermined range, the mobile terminal can provide a user with a feedback inducing the user to input a non-recognized part of a fingerprint to the mobile terminal.

However, if the input signal 1540 for the re-authentication is matched with the fingerprint information corresponding to the first content 1510 requiring user authentication in a range smaller than a first range, the mobile terminal can stop providing the first content 1510 requiring user authentication. In particular, in this instance, the mobile terminal can log out from the first content 1510 requiring user authentication. According to the aforementioned embodiments, when it is necessary to perform re-authentication for the first content requiring user authentication, the mobile terminal can provide a user with environment capable of continuously using contents by providing a feedback inducing the re-authentication to the user.

Figure 16:
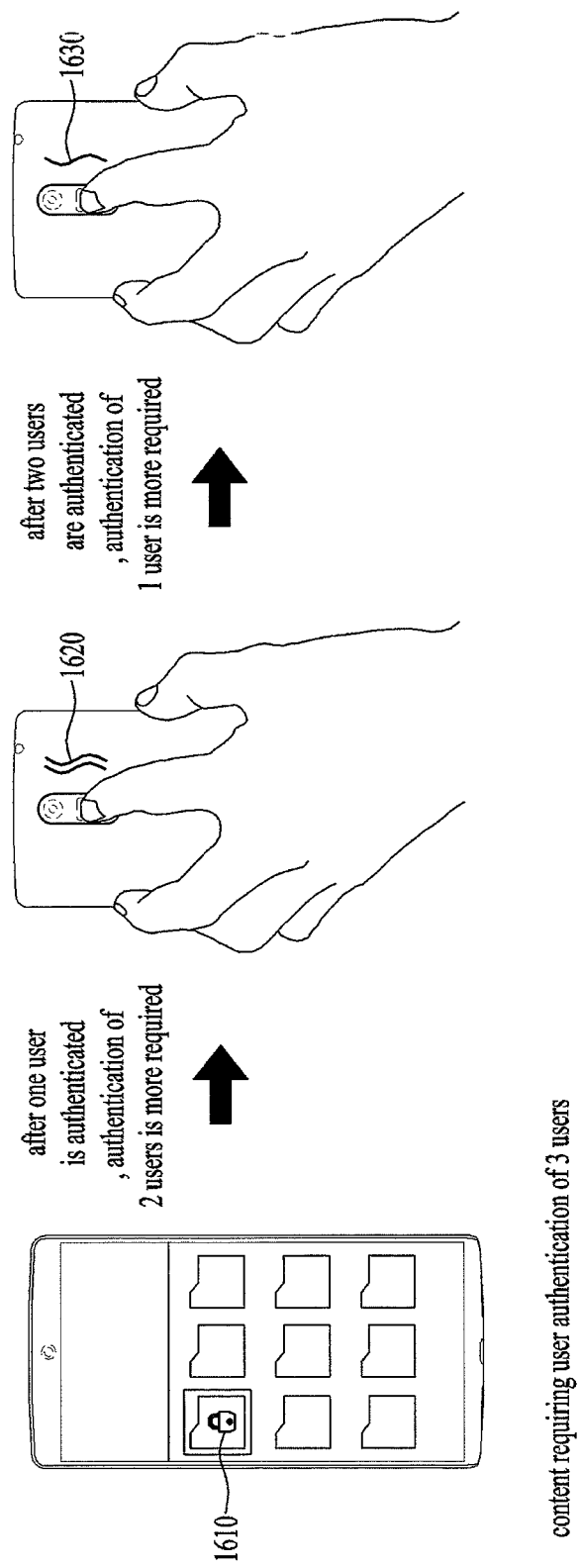
FIG. 16 is a diagram illustrating an example of user authentication of a mobile terminal according to one embodiment of the present invention.

Next, FIG. 16 is a diagram illustrating an example of user authentication of a mobile terminal according to one embodiment of the present invention. More specifically, FIG. 16 is a diagram illustrating a method of performing user authentication when authentication of a plurality of users is necessary for contents requiring user authentication.

As mentioned in the foregoing description, the contents requiring user authentication may include not only contents usable by authenticating a single user but also contents usable by authenticating all of a plurality of users. In one embodiment, the contents usable by authenticating all of a plurality of the users may correspond to contents used by a plurality of the users together such as a public folder. In another embodiment, the contents usable by authenticating all of a plurality of the users may correspond to using the mobile terminal by authenticating a plurality of the users together when a multi user mode is set to the mobile terminal. Further, in another embodiment, the contents usable by authenticating all of a plurality of the users may correspond to using contents of a lost mobile terminal via a different mobile terminal when the mobile terminal is lost. In an example of FIG. 16, contents requiring authentication of a plurality of the users may correspond to public folder content 1610.

First of all, if contents 1610 requiring authentication of a plurality of users are displayed, the mobile terminal can detect a first input signal. In this instance, the first input signal can include fingerprint information of a single user among a plurality of the users. In this instance, if the single user of a plurality of the users adds an input signal to a rear side input unit, the mobile terminal can determine whether fingerprint information included in the first input signal corresponds to fingerprint information corresponding to the contents in a predetermined range.

Also, if the fingerprint information included in the first input signal is matched with fingerprint information corresponding to the contents requiring authentication of a plurality of the users in a predetermined range, the mobile terminal can provide a user with a haptic feedback 1620 indicating the remaining number of input signals necessary for the authentication. As shown in a second drawing of FIG. 16, the mobile terminal can indicate that additional authentication of two users are more required via a haptic feedback in which two vibrations are included.

Subsequently, if one of the two users adds a third input signal to the rear side input unit, the mobile terminal can determine whether fingerprint information included in the third input signal is matched with the fingerprint information corresponding to the contents in a predetermined range. Further, if the fingerprint information included in the third input signal is matched with the fingerprint information corresponding to the contents requiring authentication of a plurality of the users in a predetermined range, the mobile terminal can provide a user with a haptic feedback 1620 indicating the remaining number of input signals necessary for the authentication. As shown in a third drawing of FIG. 16, the mobile terminal can indicate that additional authentication of one user is more required via a haptic feedback in which one vibration is included.

Subsequently, if authentication of a last user is completed, the mobile terminal can provide the contents 1610 requiring authentication of a plurality of the users on the display unit. According to the aforementioned embodiments, in case of contents requiring authentication of a plurality of users, the mobile terminal can inform a user of the number of remaining users necessary for performing authentication via a haptic feedback using vibration.

Figure 17:
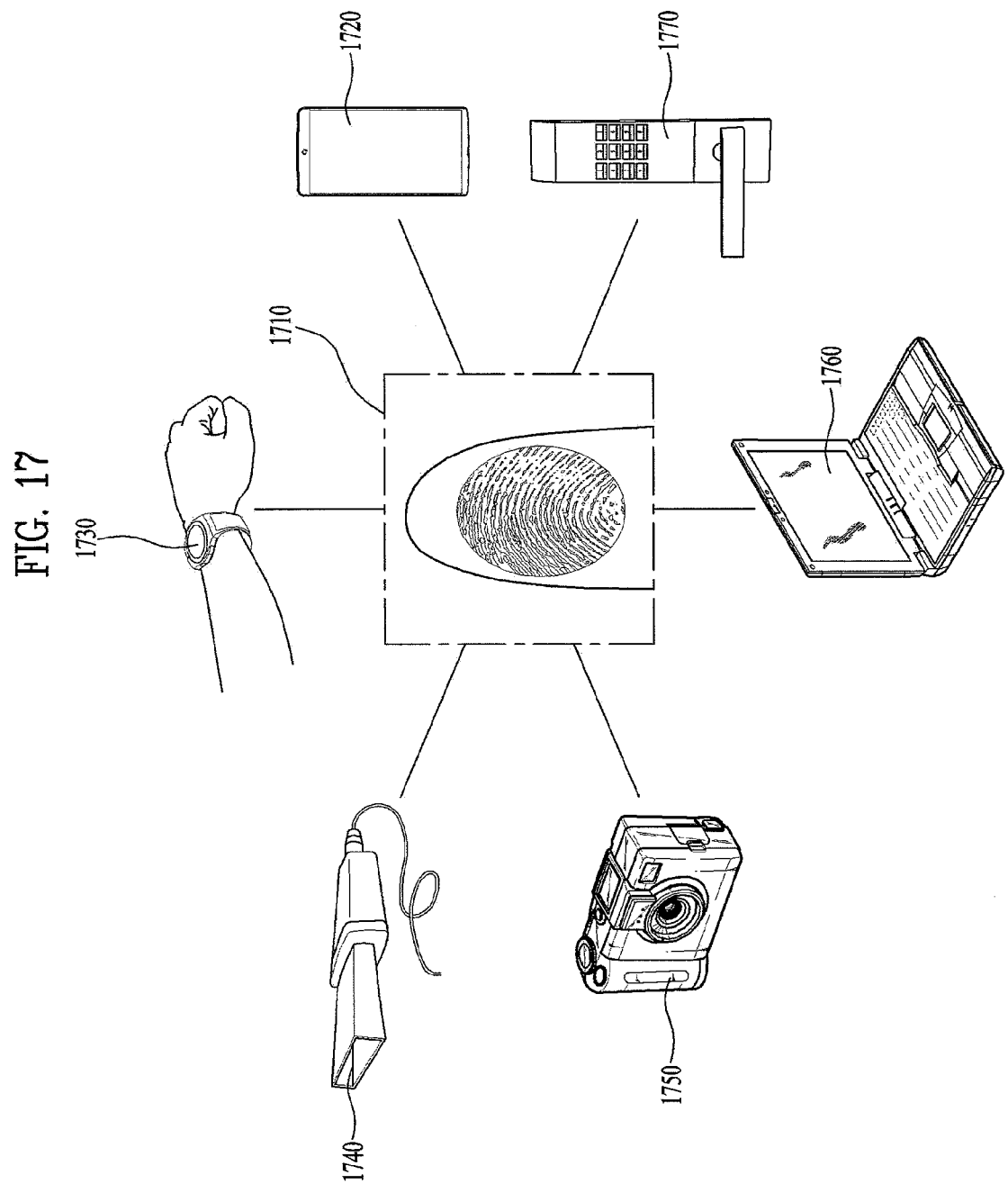
FIG. 17 is a diagram illustrating a terminal capable of performing user authentication using fingerprint information according to one embodiment of the present invention.
Figure 18:
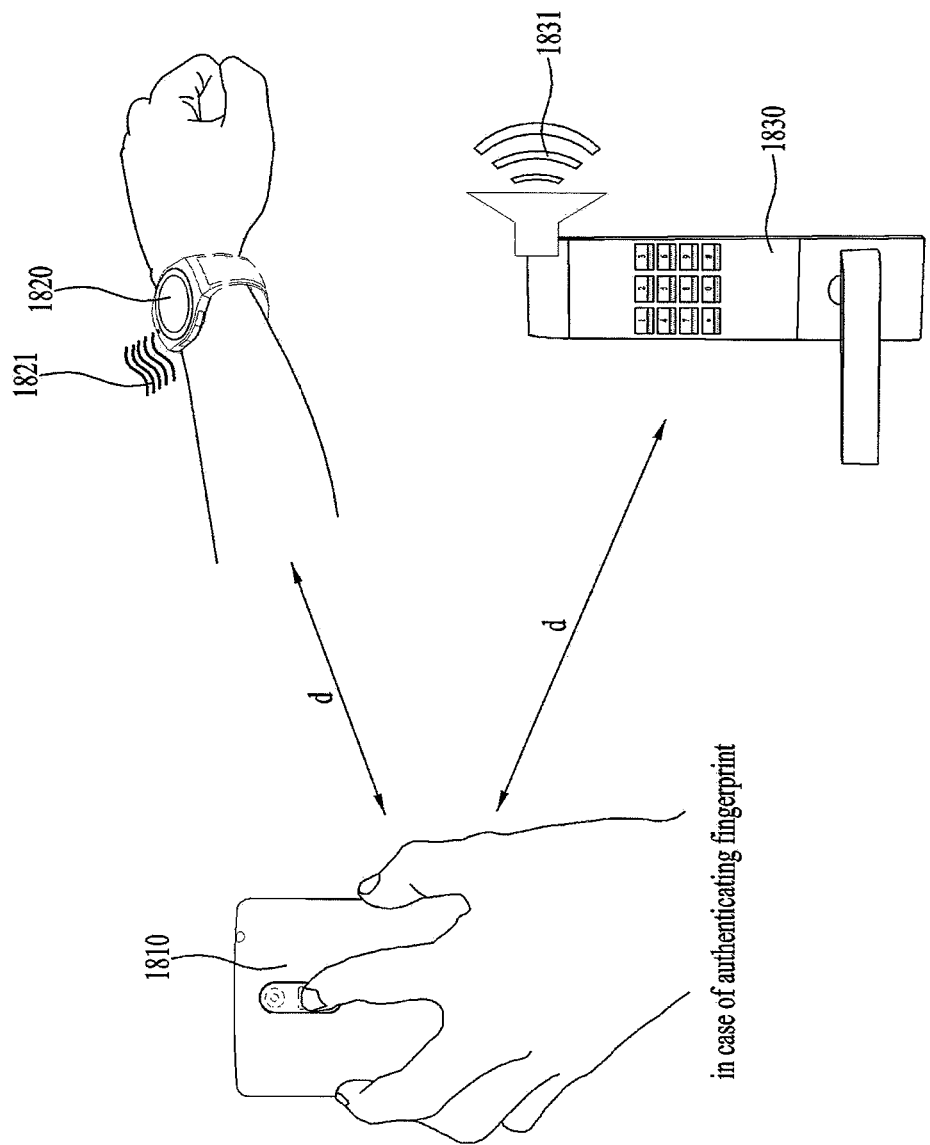
FIG. 18 is a diagram illustrating an example of user authentication of a mobile terminal according to one embodiment of the present invention.

Next, FIG. 17 and FIG. 18 show a method of authenticating a user of an external digital device based on user authentication performed by a mobile terminal when at least one or more external digital devices are paired with the mobile terminal First of all, FIG. 17 is a diagram illustrating a terminal capable of performing user authentication using fingerprint information according to one embodiment of the present invention. More specifically, an external digital device shown in FIG. 17 corresponds to an external digital device capable of performing user authentication via a fingerprint input signal 1710 when the external digital device is paired with a mobile terminal 1720.

As mentioned earlier in FIG. 5, an external digital device corresponds to a digital device capable of performing communication access with a mobile terminal. For example, as shown in FIG. 17, the external digital device can include a smart watch 1730, a USB memory 1740, a digital camera 1750, a laptop computer 1760, and a door lock 1770. In addition, for example, the external digital device can include a glass-type terminal, a drone and the like. Besides, the external digital device can include various digital devices capable of being paired with a mobile terminal.

When performing pairing, the mobile terminal and the external digital device perform communication access and can transceive data in both directions. The pairing can be performed via Bluetooth, NFC (near field communication) or the like. Assume that the mobile terminal 1720 and the external digital device 1730 to 1770 shown in FIG. 17 can perform user authentication using an identical fingerprint input signal 1710. For example, fingerprint information 1710 may correspond to a fingerprint of a left index finger.

FIG. 18 is a diagram illustrating an example of user authentication of a mobile terminal according to one embodiment of the present invention. First of all, a mobile terminal 1810 can perform pairing with an external digital device. In an example of FIG. 18, the external digital device corresponds to a watch-type terminal 1820 or a door lock 1830. In particular, the mobile terminal 1810 can be paired with the watch-type terminal 1820 and the door lock 1830. Further, the mobile terminal 1810 may be positioned at a predetermined distance range (d) with the external digital device. In the example of FIG. 18, the mobile terminal 1810 can be positioned at the predetermined distance range (d) with the smart watch 1820 and the door lock 1830, respectively.

In this instance, the mobile terminal 1810 can detect a first input signal for using first content. In this instance, the first input signal may correspond to a signal not only for using the first content but also for unlock of the mobile terminal In a first drawing of FIG. 18, the mobile terminal 1810 can detect an input signal of a left index finger input on a rear side input unit. Subsequently, the mobile terminal 1810 can determine whether fingerprint information corresponding to the first content is matched with first fingerprint information included in the first input signal in a predetermined range. If the fingerprint information corresponding to the first content is matched with the first fingerprint information included in the first input signal, the mobile terminal 1810 can provide the first content to a user. In relation to this, the mobile terminal can determine whether fingerprints are matched with each other using a method identical to the method mentioned earlier in FIG. 11 to FIG. 13 and can induce a user to input a fingerprint to the mobile terminal.

In this instance, the mobile terminal 1810 can transmit a user authentication signal to the external digital device positioned within a predetermined distance range (d). For example, the predetermined distance range (d) may correspond to 50 cm. In an embodiment of FIG. 18, the mobile terminal 1810 can transmit a user authentication signal to the watch-type terminal 1820 positioned within the predetermined distance range (d). In this instance, the watch-type terminal 1820 can provide a user with contents requiring user authentication included in the watch-type terminal 1820 via the received user authentication signal without performing separate user authentication in the watch-type terminal 1820. Also, the mobile terminal 1810 can transmit an authentication feedback signal to the watch-type terminal 1820. Hence, the watch-type terminal 1820 provides a haptic feedback 1821 to a user based on the received authentication feedback signal and can then inform the user that the user authentication is completed. For example, the haptic feedback 1821 may correspond to 5 vibrations.

In addition, in the embodiment of FIG. 18, the mobile terminal 1810 can transmit a user authentication signal to the door lock 1830 positioned within a predetermined distance range (d) from the mobile terminal 1810. In this instance, the door lock 1830 can unlock the door lock 1830 via the received user authentication signal without performing a separate user authentication for the door lock 1830. Also, the mobile terminal 1810 can transmit an authentication feedback signal to the door lock 1830. Hence, the door lock 1830 provides a user with a sound feedback 1830 based on the received authentication feedback signal and may be then able to inform the user that the door lock is unlocked.

According to the aforementioned embodiments, if a mobile terminal performs a user authentication, an external digital device positioned at a short distance from the mobile terminal performs a user authentication without a separate input signal input on the external digital device and can then provide contents requiring security to a user.

Figure 19:
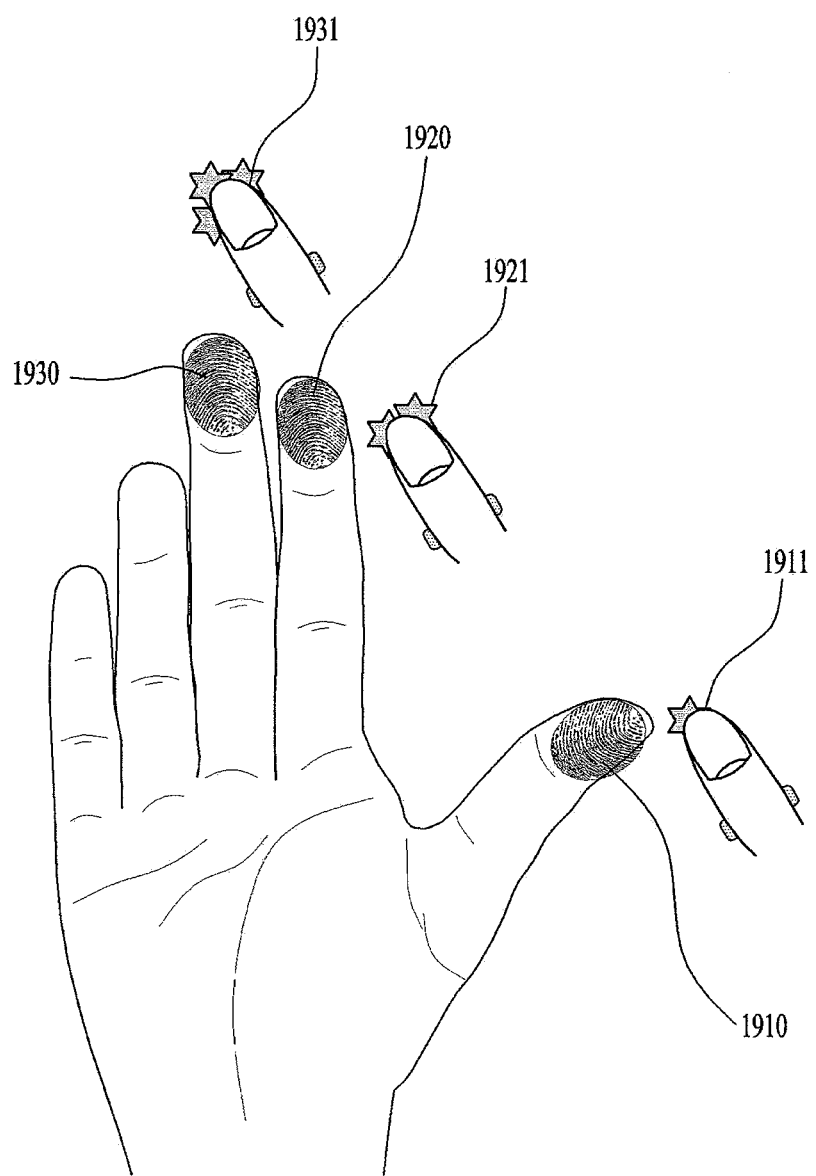
FIG. 19 is a diagram illustrating fingerprint information of each finger of a user and gesture information according to one embodiment of the present invention.
Figure 20:
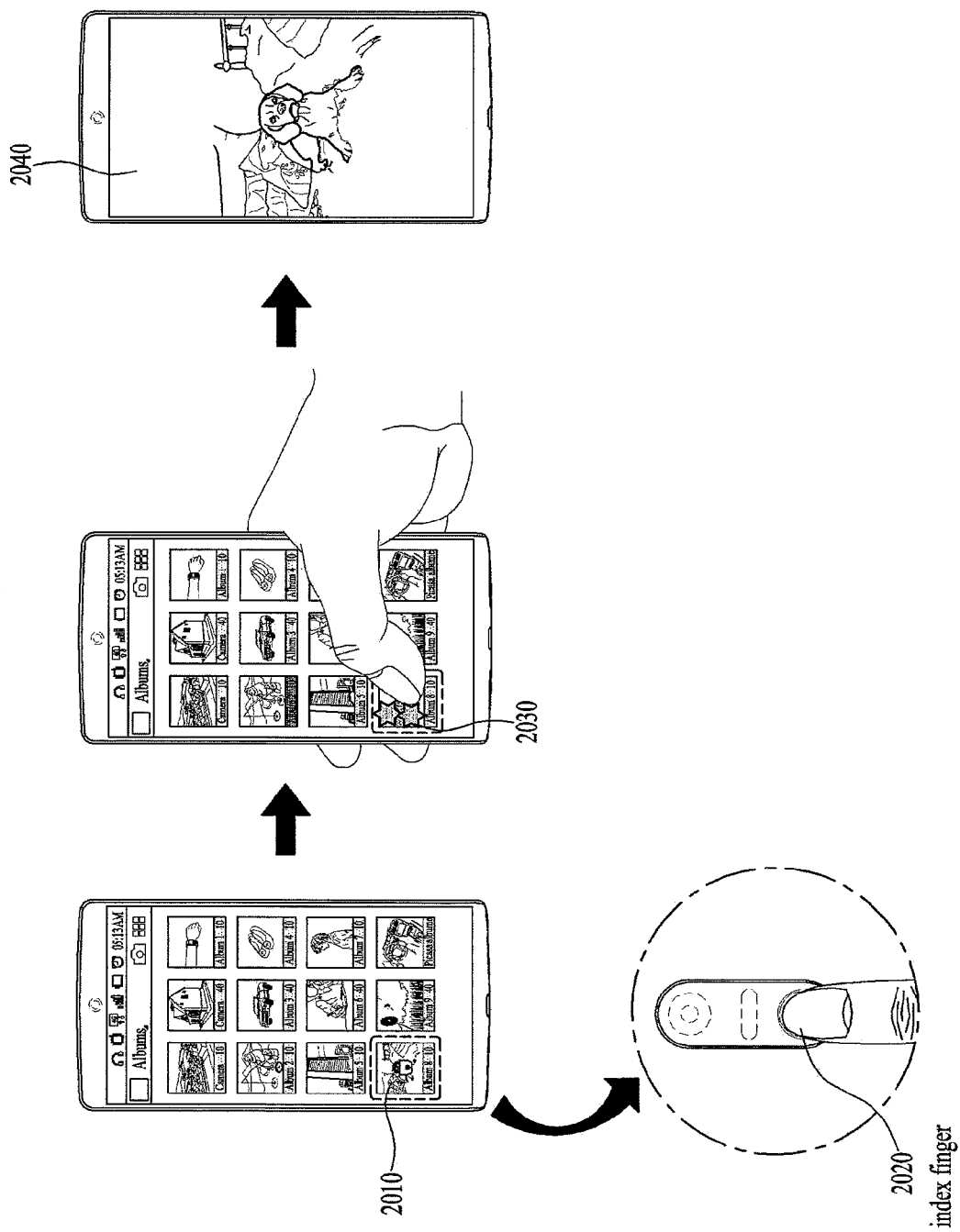
FIG. 20 is a diagram illustrating an example of user authentication of a mobile terminal according to one embodiment of the present invention.

In the following, FIG. 19 and FIG. 20 are diagrams illustrating a method of performing user authentication when not only fingerprint information corresponding to first content requiring user authentication but also gesture information corresponding to the first content is registered. First of all, FIG. 19 is a diagram illustrating fingerprint information of each finger of a user and gesture information according to one embodiment of the present invention.

The mobile terminal can register fingerprint information according to each finger of a proper user. And, the mobile terminal can register a gesture operation according to each finger in response to the fingerprint information registered according to each finger. For example, as shown in FIG. 19, the mobile terminal can register a corresponding single touch input 1911 at fingerprint information 1910 of a right thumb. For example, as shown in FIG. 19, the mobile terminal can store corresponding multi touch inputs 1921 input two times in fingerprint information 1920 of a right index finger. And, for example, as shown in FIG. 19, the mobile terminal can store corresponding multi touch inputs 1931 input three times in fingerprint information 1930 of a right middle finger. Meanwhile, a fingerprint input and a gesture input corresponding to the fingerprint input may be non-limited by the aforementioned embodiments. And, the gesture input can be input in various ways except the aforementioned touch input.

In addition, in case of contents requiring a plurality of user authentications, the mobile terminal can register fingerprint information and a gesture operation in response to each of the contents. For example, the mobile terminal can register fingerprint information 1920 of a right index finger and multi touch inputs 1921 input two times as fingerprint information corresponding to bank contents. And, for example, the mobile terminal can register fingerprint information 1930 of a right middle finger and multi touch inputs 1931 input three times as fingerprint information corresponding to e-mail contents. By doing so, a user can conveniently enter contents via a fingerprint input or a gesture input without inputting a separate password to use each of the contents requiring user authentication.

FIG. 20 is a diagram illustrating an example of user authentication of a mobile terminal according to one embodiment of the present invention. First of all, the mobile terminal can detect a first input signal for using first content requiring user authentication. Referring to a first drawing of FIG. 20, content requiring user authentication may correspond to an image 2010 requiring partial security among a plurality of album contents. In this instance, the first input signal can include first fingerprint information and first gesture information. Referring to FIG. 20, the first fingerprint information corresponds to a right thumb and the first gesture information may correspond to multi touch inputs input two times. Referring to FIG. 20, fingerprint information corresponding to the first content corresponds to a right index finger 2020 and gesture information may correspond to multi touch inputs input two times.

In this instance, the mobile terminal can determine whether fingerprint information corresponding to the first content 2010 requiring user authentication is matched with the first fingerprint information in a predetermined range. As mentioned in the foregoing description, the fingerprint information 2020 corresponding to the first content 2010 requiring user authentication may correspond to fingerprint information of the right index finger. Hence, the mobile terminal can determine that the fingerprint information of the right index finger included in the first input signal is not matched with the fingerprint information corresponding to the content requiring user authentication in the predetermined range. Meanwhile, in this instance, fingerprint information of the right thumb may correspond one of fingerprint information registered at the mobile terminal.

In addition, the mobile terminal can determine whether first gesture information included in the first input signal corresponds to gesture information corresponding to the content requiring user authentication. As mentioned in the foregoing description, the mobile terminal can store multi touch inputs 1530 input two times as a gesture input corresponding to a fingerprint input of a right index finger. Hence, as shown in FIG. 20, the mobile terminal can determine multi touch inputs of a user input two times on a front side display unit of the mobile terminal as a gesture signal corresponding to the content requiring user authentication. Hence, as shown in a third drawing of FIG. 20, the mobile terminal can provide first content 2040 requiring user authentication to a user. Yet, if first fingerprint information does not correspond to fingerprint information registered at the mobile terminal, although the first gesture information is matched with gesture information corresponding to the first content, the mobile terminal can determine it as user authentication is not performed.

Figure 21:
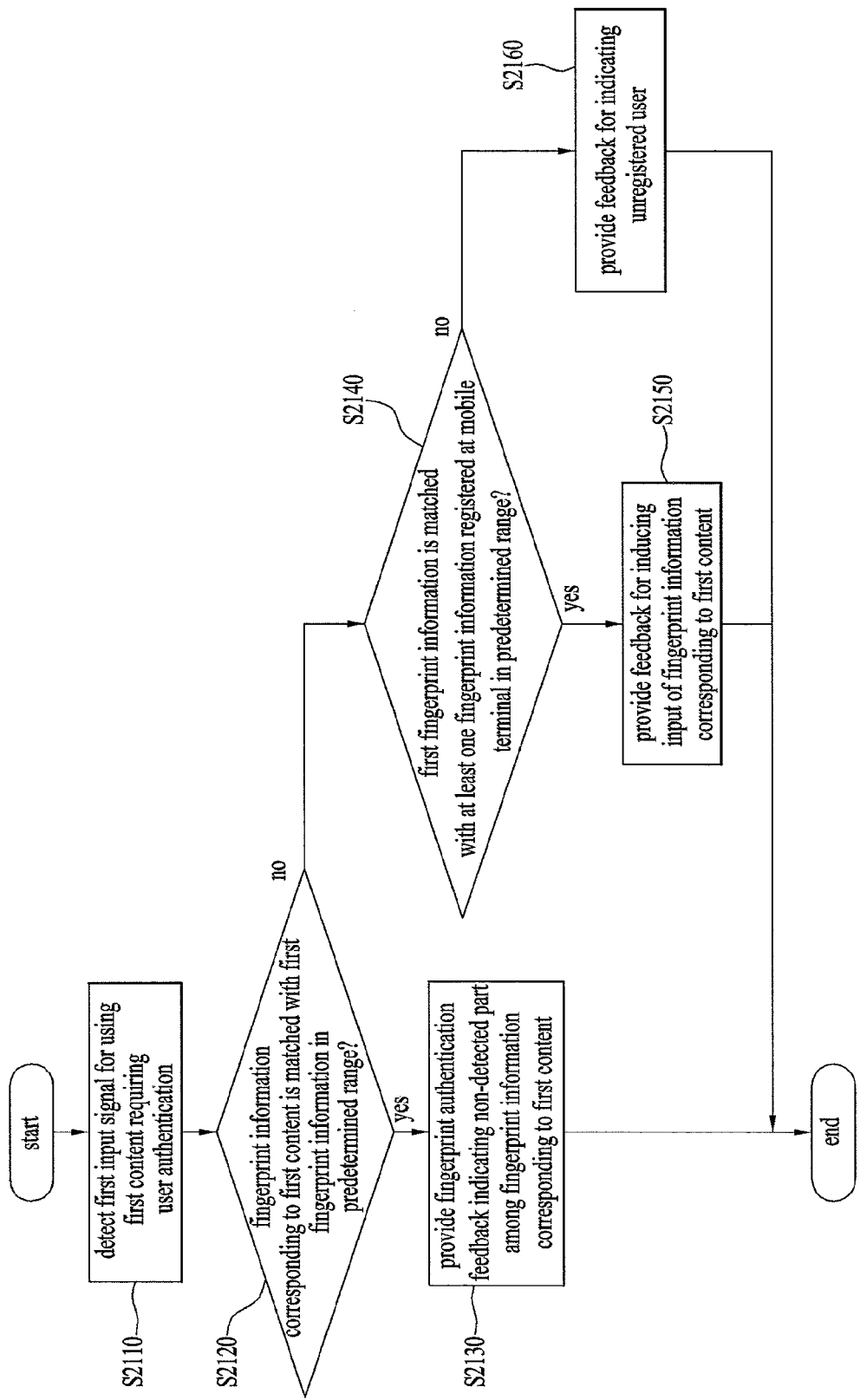
FIG. 21 is a flowchart illustrating a method of controlling a mobile terminal according to one embodiment of the present invention.

According to the aforementioned embodiments, if it is difficult to input fingerprint information corresponding to content requiring user authentication, a user performs a gesture input corresponding to the fingerprint information and may be then able to easily use the content. FIG. 21 is a flowchart for a method of controlling a mobile terminal according to one embodiment of the present invention. In the following, each step of FIG. 21 can be controlled by a controller of a mobile terminal shown in FIG. 5.

First of all, the mobile terminal can detect a first input signal for using first content requiring user authentication (S2110). In this instance, the first input signal can include first fingerprint information. Subsequently, the mobile terminal can determine whether fingerprint information corresponding to the first content is matched with the first fingerprint information in a predetermined range (S2120). As mentioned earlier in FIG. 10, the predetermined range indicates a range belonging to a first range to a second range where the fingerprint information corresponding to the first content is matched with the first fingerprint information.

In the step S2120, if the fingerprint information corresponding to the first content is matched with the first fingerprint information in the predetermined range, the mobile terminal can provide a user with a fingerprint authentication feedback indicating a non-detected part among the fingerprint information corresponding to the first content (S2130). As mentioned earlier in FIG. 11, the fingerprint authentication feedback can include a haptic feedback, a visual feedback, a sound feedback and the like.

Meanwhile, in the step S2120, if the fingerprint information corresponding to the first content is not matched with the first fingerprint information in the predetermined range, the mobile terminal can determine whether at least one fingerprint information registered at the mobile terminal are matched with the first fingerprint information in the predetermined range (S2140).

In the step S2140, if the first fingerprint information is matched with the at least one fingerprint information registered at the mobile terminal in the predetermined range, the mobile terminal can provide a user with a feedback inducing an input corresponding to fingerprint information, which corresponds to the first content (S2150). As mentioned earlier in FIG. 12, the feedback inducing the input corresponding to the first content can include a haptic feedback, a visual feedback and the like.

Meanwhile, in the step S2140, if the first fingerprint information is not matched with the at least one fingerprint information registered at the mobile terminal in the predetermined range, the mobile terminal can provide a user with a feedback indicating that the user is not a registered user (S2160). As mentioned earlier in FIG. 13, the feedback indicating an unregistered user can include a camera feedback, a sound feedback, a visual feedback and the like.

Meanwhile, the step S2120 and the step S2140 can be performed in reverse order. In particular, the mobile terminal can preferentially determine whether the first fingerprint information included in the first input signal is matched with the at least one fingerprint information registered at the mobile terminal in the predetermined range. Subsequently, the mobile terminal can determine whether the first fingerprint information included in the first input signal is matched with the fingerprint information corresponding to the first content in the predetermined range.

FIG. 22 is a flowchart for a method of controlling a mobile terminal according to one embodiment of the present invention. In the following, each step of FIG. 22 can be controlled by the controller of the mobile terminal shown in FIG. 5. And, in each embodiment of FIG. 22, detail explanation on a part identical to or corresponding to the embodiment of FIG. 21 is omitted at this time.

First of all, the mobile terminal can detect a first input signal for using first content requiring user authentication (S2210). In this instance, the first input signal can include first fingerprint information and first gesture information. As mentioned earlier in FIG. 19, fingerprint information corresponding to content requiring user authentication and gesture information may be registered at the mobile terminal by being matched with each other.

Subsequently, the mobile terminal can determine whether fingerprint information corresponding to the first content is matched with first fingerprint information in a predetermined range (S2220). In the step S2220, if the fingerprint information corresponding to the first content is matched with the first fingerprint information in the predetermined range, the mobile terminal can provide a user with a feedback indicating a non-detected part among the fingerprint information corresponding to the first content (S2230).

Meanwhile, in the step S2220, if the fingerprint information corresponding to the first content is not matched with the first fingerprint information in the predetermined range, the mobile terminal can determine whether gesture information corresponding to the first content is matched with first gesture information (S2240). In this instance, assume that the first fingerprint information is matched with at least one fingerprint information registered at the mobile terminal in the predetermined range.

In the step S2240, if the gesture information corresponding to the first content is matched with the first gesture information, the mobile terminal can provide a user with the first content requiring user authentication (S2250). Meanwhile, in the step S2240, if the gesture information corresponding to the first content is not matched with a first touch input signal, the mobile terminal can provide the user with a feedback indicating that the user is not a registered user (S2260).

Advantageous effects for a mobile terminal according to an embodiment of the present invention and a method of controlling therefor are described in the following. Embodiments of the present invention provide a mobile terminal capable of easily recognizing a part to which a fingerprint is not input and a method of controlling therefor. Further, when various fingerprints are registered at a plurality of contents, the user can know a finger registered according to content even though he or she does not remember the finger. According to at least one or more embodiments, the present invention provides a mobile terminal making a user inaccessible to contents requiring user authentication using a copied fingerprint and a method of controlling therefor.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure.

The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a display unit;
a fingerprint sensing unit;
a memory configured to store fingerprint information; and
a controller configured to:
receive a first fingerprint input via the fingerprint sensing unit for displaying content requiring user authentication,
compare the first fingerprint input with the stored fingerprint information,
output fingerprint authentication feedback indicating the first fingerprint input is insufficient for displaying the content requiring user authentication, in response to the first fingerprint input matching with the stored fingerprint information within a first predetermined range but less than a second predetermined range greater than the first predetermined range,
receive a second fingerprint input via the fingerprint sensing unit,
compare the first fingerprint input and the second fingerprint input with the stored fingerprint information, and
display the content requiring the user authentication in response to the first fingerprint input and the second fingerprint input matching with the stored fingerprint information within the second predetermined range,
wherein the second fingerprint input includes a non-detected part of the first fingerprint input, and
wherein the second fingerprint input is a same finger as the first fingerprint input.

2. The mobile terminal of claim 1, wherein the fingerprint authentication feedback is output to induce a user to input the second fingerprint input to include the non-detected part of the first fingerprint input.

3. The mobile terminal of claim 1, wherein the second fingerprint input is a second finger different than a first finger inputting the first fingerprint input.

4. The mobile terminal of claim 1, wherein the second fingerprint input and input includes a movement of the finger on the fingerprint sensing unit without removing the finger from the fingerprint sensing unit.

5. The mobile terminal of claim 1, wherein the controller is further configured to output a feedback indicating an unregistered user when the first fingerprint input is less than the first predetermined range.

6. The mobile terminal of claim 1, wherein the fingerprint authentication feedback includes at least one of a haptic feedback, a visual feedback and a sound feedback.

7. The mobile terminal of claim 1, wherein the stored fingerprint information includes at least one of a fingerprint pattern of a finger and sweat gland information of the finger.

8. The mobile terminal of claim 1, wherein the fingerprint sensing unit is mounted on a rear side of the mobile terminal or is included with the display unit to sense the first and second fingerprint inputs on the display unit.

9. The mobile terminal of claim 1, further comprising:
a camera,
wherein the controller is further configured to control the camera to capture an image of a user inputting the first fingerprint input when the first fingerprint input is less than the first predetermined range.

10. The mobile terminal of claim 1, wherein the controller is further configured to:
output a feedback when the first fingerprint input touches a predetermined content on the display unit requiring user authentication indicating the second fingerprint input is required on a rear fingerprint sensing unit on a rear of the mobile terminal.

11. The mobile terminal of claim 1, wherein the content requiring the user authentication corresponds to content requiring authentication of a plurality of users, and
wherein the first fingerprint input corresponds to a fingerprint of a first user among the plurality of users.

12. The mobile terminal of claim 11, wherein the controller is further configured to output feedback after receiving the first fingerprint input indicating how many more users among the plurality of users must input a fingerprint input to display the content requiring the user authentication of the plurality of users.

13. The mobile terminal of claim 12, wherein the second fingerprint input corresponds to a fingerprint of a second user among the plurality of users.

14. The mobile terminal of claim 1, further comprising:
a communication unit configured to wirelessly transmit and receive a signal with an external digital device,
wherein the controller is further configured to:

provide a user authentication signal to the external digital device positioned within a predetermined distance range from the mobile terminal in response to the first fingerprint input being within the first predetermined range and the second fingerprint input being within the second predetermined range, and provide an authentication feedback signal to the external digital device indicating the user authentication for displaying the content is successful.

15. A method of controlling a mobile terminal, the method comprising:

receiving a first fingerprint input via a fingerprint sensing unit for displaying content requiring user authentication;

comparing, via a controller, the first fingerprint input with fingerprint information stored in a memory;

outputting fingerprint authentication feedback indicating the first fingerprint input is insufficient for displaying the content requiring user authentication, in response to the first fingerprint input being within a first predetermined range but less than a second predetermined range greater than the first predetermined range;

receiving a second fingerprint input via the fingerprint sensing unit;

comparing, via the controller, the first fingerprint input and the second fingerprint input with the stored fingerprint information; and displaying the content requiring the user authentication on a display unit in response to the first fingerprint input and the second fingerprint input being within the second predetermined range, wherein the second fingerprint input includes a non-detected part of the first fingerprint input, and wherein the second fingerprint input is a same finger as the first fingerprint input.

16. The method of claim 15, wherein the fingerprint authentication feedback is output to induce a user to input the second fingerprint input to include the non-detected part of the first fingerprint input.

17. The method of claim 15, wherein the second fingerprint input is a second finger different than a first finger inputting the first fingerprint input.

18. The method of claim 15, wherein the second fingerprint input includes a movement of the finger on the fingerprint sensing unit without removing the finger from the fingerprint sensing unit.

* * * * *